United States Patent
Iijima

(10) Patent No.: US 7,512,546 B2
(45) Date of Patent: Mar. 31, 2009

(54) STORE SYSTEM

(75) Inventor: Junichi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/390,021

(22) Filed: Mar. 18, 2003

(65) Prior Publication Data

US 2003/0163377 A1 Aug. 28, 2003

Related U.S. Application Data

(63) Continuation of application No. PCT/JP00/06388, filed on Sep. 19, 2000.

(30) Foreign Application Priority Data

Sep. 19, 2000 (JP) .................. PCT/JP00/06388

(51) Int. Cl.
*G06Q 20/00* (2006.01)

(52) U.S. Cl. .............. 705/16; 235/382; 235/2; 235/380; 235/472.01; 705/17; 705/18; 705/21; 379/111; 379/88.01

(58) Field of Classification Search ............ 705/16, 705/17, 18, 21; 235/382, 2, 380, 472.01; 379/111, 88.01
See application file for complete search history.

(56) References Cited

U.S. PATENT DOCUMENTS

| | | | | |
|---|---|---|---|---|
| 5,310,349 A | * | 5/1994 | Daniels et al. | 434/350 |
| 5,326,270 A | * | 7/1994 | Ostby et al. | 434/362 |
| 5,457,792 A | * | 10/1995 | Virgil et al. | 707/3 |
| 5,535,256 A | * | 7/1996 | Maloney et al. | 379/309 |
| 5,829,003 A | * | 10/1998 | Okura | 707/100 |
| 6,343,311 B1 | * | 1/2002 | Nishida et al. | 709/203 |
| 6,404,856 B1 | * | 6/2002 | Wilcox et al. | 379/67.1 |
| 6,510,220 B1 | * | 1/2003 | Beckett et al. | 379/265.06 |
| 6,574,628 B1 | * | 6/2003 | Kahn et al. | 707/10 |
| 6,604,141 B1 | * | 8/2003 | Ventura | 709/227 |

(Continued)

FOREIGN PATENT DOCUMENTS

JP 58-29065 2/1983

(Continued)

OTHER PUBLICATIONS

Inspec Abstract, Integrated Operation System for telecom equipment, Oct. 1990.*

(Continued)

*Primary Examiner*—F. Zeender
*Assistant Examiner*—Fawaad Haider
(74) *Attorney, Agent, or Firm*—Kratz, Quintos & Hanson, LLP.

(57) ABSTRACT

A store system comprises: store controller 21 incorporating programs for executing sales and sales management tasks; display 27 for displaying a screen for the execution of a task specified by each of the programs; first input means for inputting data to store controller 21 based on an instruction displayed on the screen produced on the display 27; and second input means for inputting handwritten or voice memo information to store controller 21. Store controller 21 requests an operator to select key information to be appended to the memo information when the operator inputs the memo information via the second input means, and stores the memo information, together with the appended key information, in a storage device within the system.

1 Claim, 29 Drawing Sheets

U.S. PATENT DOCUMENTS 6,654,458 B1 * 11/2003 Saleh .................... 379/265.03
6,853,710 B2 * 2/2005 Harris ................... 379/142.01

FOREIGN PATENT DOCUMENTS

| JP | 61-175773 | 8/1986 |
| JP | 62-169263 | 7/1987 |
| JP | 6-301860 | 10/1994 |
| JP | 10-91868 | 4/1998 |
| JP | 11-144153 | 5/1999 |
| JP | 11-168552 | 6/1999 |
| JP | 2000-11261 | 1/2000 |
| WO | WO 98/52175 * 11/1998 ................ 705/16 |

OTHER PUBLICATIONS

Urrows, Henry and Urrows, Elizabeth. The future of transactional card technologies, Jul.-Aug. 1989, Optical Information Systems, vol. 9, No. 4, p. 190 (19).*

PCT Notice Informing the Applicant Of The Communication Of The International Application To The Designated Offices including International Search Report for corresponding International Application No. PCT/JP00/06388 dated Mar. 28, 2002.

PCT Notification Of Transmittal Of Copies Of Translation Of The International Preliminary Examination Report including International Preliminary Examination Report for corresponding International Application No. PCT/JP00/06388 dated Jan. 31, 2003.

* cited by examiner

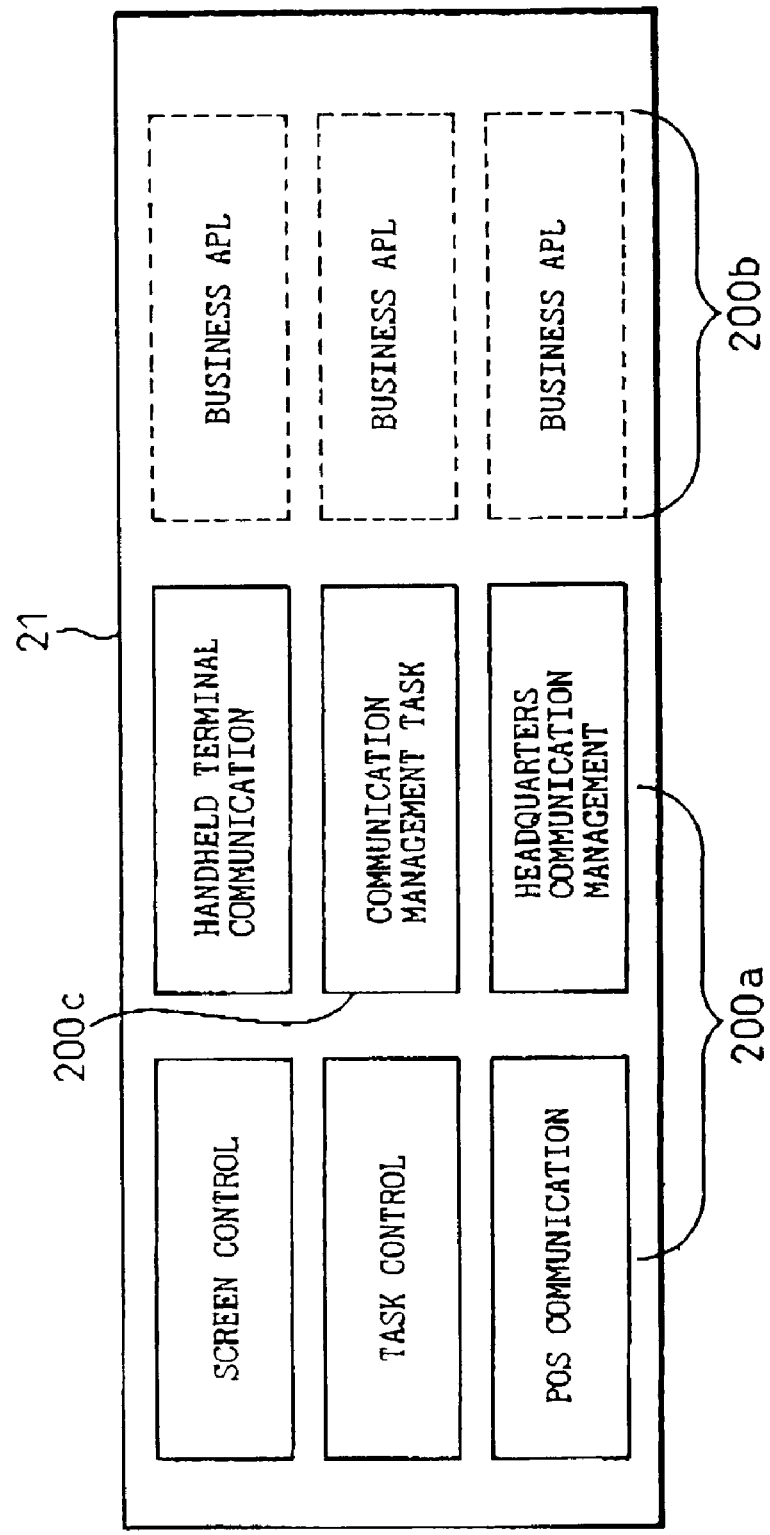

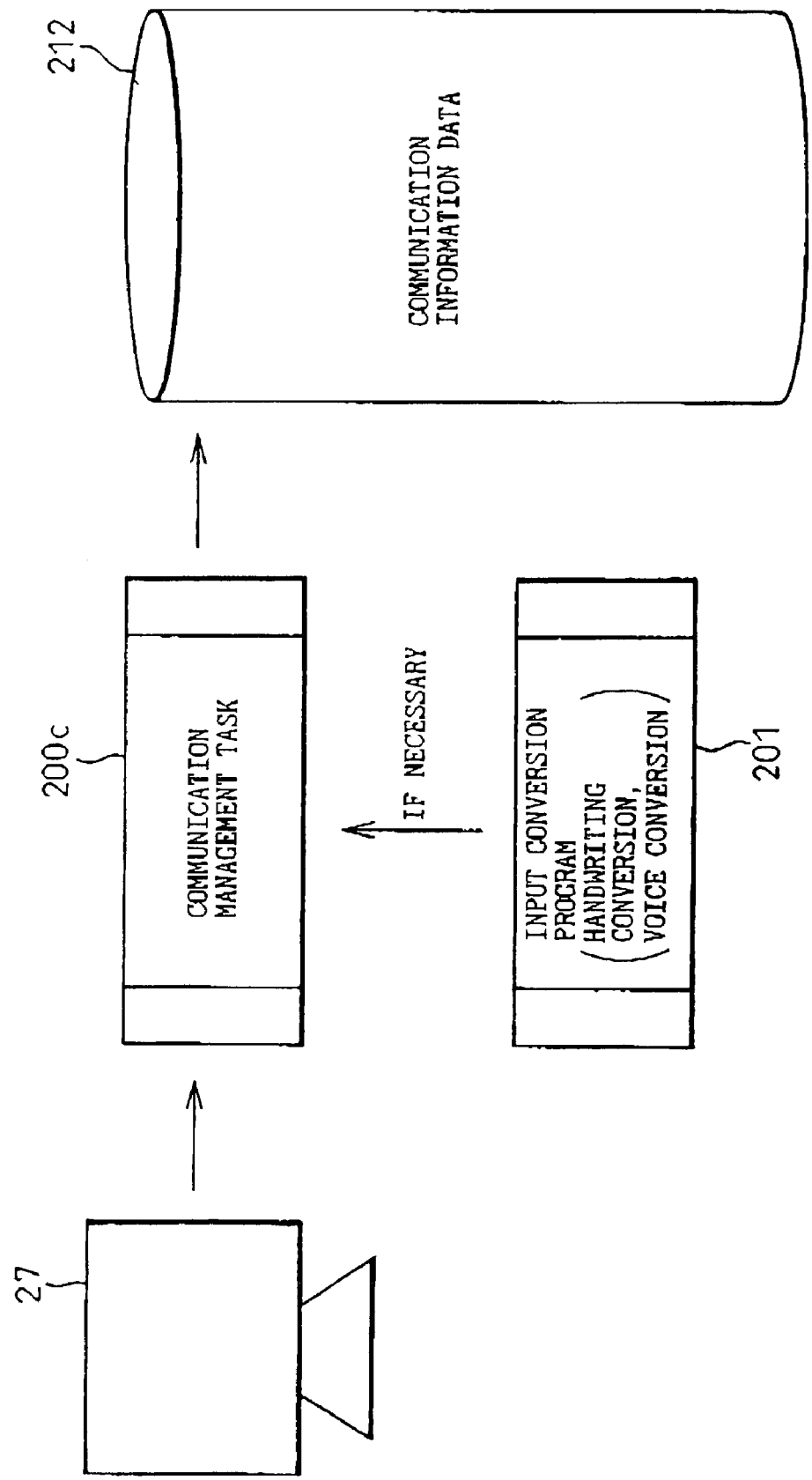

Fig.7A

| HEADER | DATA (TEXT) | DATA (RAW) |
|---|---|---|
| 60 | 70 | 80 |

Fig.7B

| MEMO NUMBER | OPERATOR CODE | | EMPLOYEE CODE | PRODUCT CODE | TASK CODE | INPUT DATE/TIME | | DATA VALIDITY DATE | REPLY NEEDED/ NOT-NEEDED SECTION | | INFORMATION PRESENTED DATE | RELATED MEMO NUMBER |
|---|---|---|---|---|---|---|---|---|---|---|---|---|
| 60a | 60b | 60c | 60d | 60e | 60f | 60g | 60h | 60i | 60j | 60k | 60ℓ | 60m |

- 60b: KEY DESIGNATING SECTION
- 60c: KEY COMBINATION
- 60d–60f: KEY ITEMS
- 60h: DATE DESIGNATION
- 60k: COMPLETION SECTION

Fig. 26

| MAIN MENU | Select task operation. To select, position the mouse pointer on the desired task item and click on it, or move the cursor to the desired item using arrow keys [↑→↓←] and press ENTER key. | April 7(Fri.),2000 13:00 |

MESSAGE INPUT

Input your message. Don't forget to set the destination and the display period. [END]

PRODUCT NAME

PRODUCT SELECTION

| DESTINATION | ITO KOJI ▶ | ORDER PURCHASING STOCK CHECK MERCHANDISE LINE EVALUATION SETTLEMENT INSPECTION | ▶ | TO OWNER |

DISPLAY PERIOD  ●SAME DAY ○SPEC  ◁ to (Month)(Day) ▷

SENDER    NIPPON TARO

REPLY NEEDED/NOT-NEEDED   ○NEEDED ●NOT

51

The cherry-blossom season has come.
Be sure to order a little more 1.5-liter
PET bottles and rice balls than usual.

CLOCK-IN
CLOCK-OUT
MEMO INPUT
SCHEDULE
CANCEL OPERATION

POS1 POS2     MASER UPDATING   COMMUNICATING   WEATHER FORECAST

Fig. 27

| MAIN MENU | Select task operation.<br>To select, position the mouse pointer on the desired task item and click on it, or move the cursor to the desired item using arrow keys (↑ → ↓ ←) and press ENTER key. | April 7(Fri.), 2000 13:00 |
|---|---|---|

MESSAGE INPUT

Input your message. Don't forget to set the destination and the display period.        END

| PRODUCT NAME | EMPLOYEE SELECTION | TASK SELECTION | PRODUCT SELECTION | |
|---|---|---|---|---|
| DESTINATION | ▼ | ▼ | ▼ | TO OWNER |
| DISPLAY PERIOD | ○ SAME DAY ● SPECIFY PERIOD: | FROM APRIL 5 to MAY 15 | | |
| | ○ NEEDED ● NOT NEEDED | SENDER | NIPPON TARO | |

REPLY NEEDED/ NOT-NEEDED

*The cherry-blossom season has come.*
*Be sure to order a little more 1.5-liter*
*PET bottles and rice balls than usual.*

51

| POS1 | POS2 | | | | | MASER UPDATING | COMMUNICATING | WEATHER FORECAST | CLOCK-IN | CLOCK-OUT | MEMO INPUT | SCHEDULE | CANCEL OPERATION |

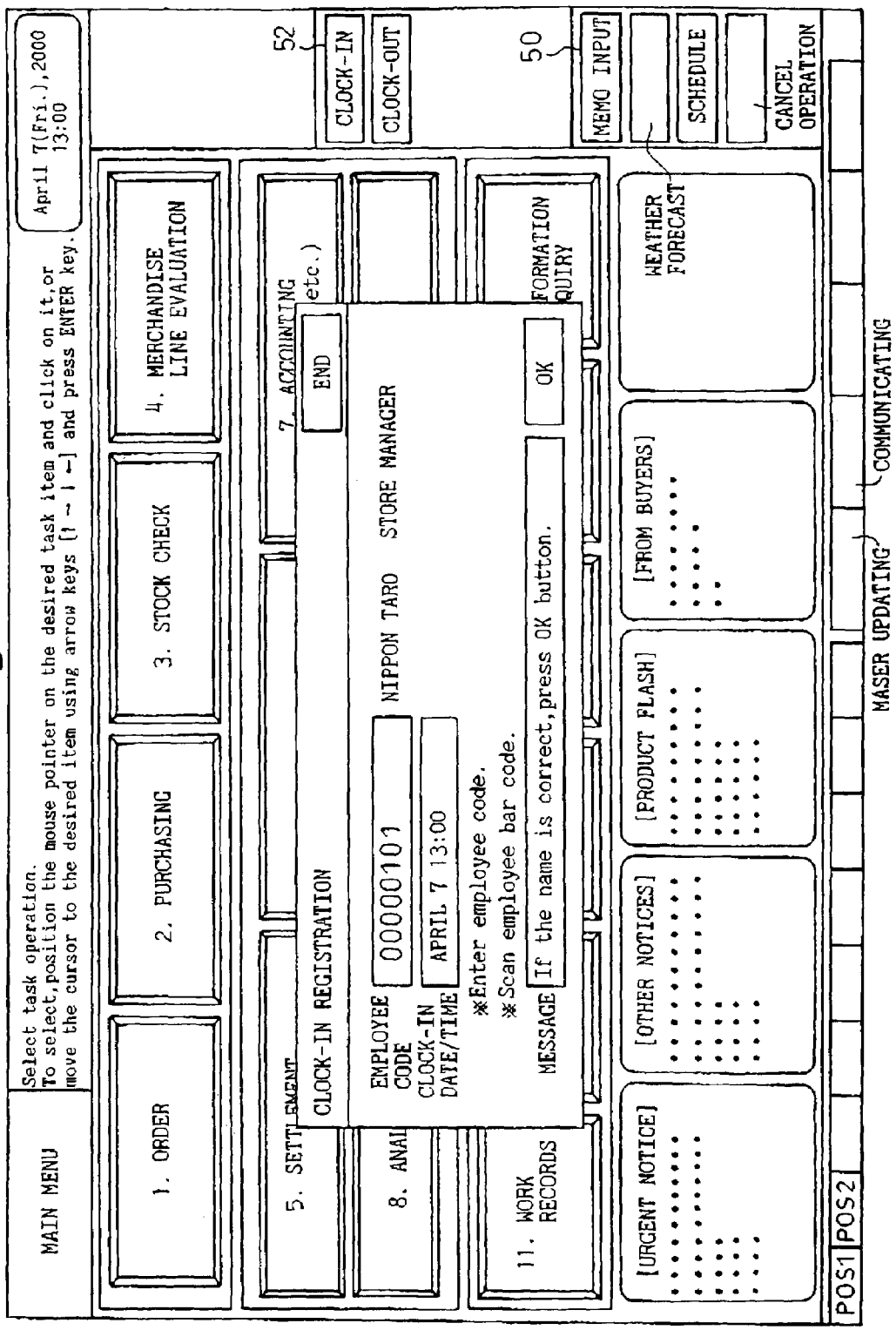

Fig. 31

STORE SYSTEM

CROSS-REFERENCE TO RELATED APPLICATION

This application is a continuation application based upon PCT/JP 00/06388 which was filed on Sep. 19, 2000.

BACKGROUND OF THE INVENTION

1. Field of the Invention

The present invention relates to a store system to be used, for example, in a convenience store or the like and, more particularly, to a store system improved so as to enable store employees to efficiently communicate with each other in a store or the like where a plurality of employees are working in staggered shifts.

2. Prior Art

In a large-scale retail system, for example, a convenience store system, tens to hundreds of stores (convenience stores), each equipped with basically the same store system, are linked to the headquarters via communication lines. Not only the computer system (store system) but also the work operation is basically the same in each of these stores.

Many such convenience stores operate 24 hours a day, 365 days a year, and the store manager or like person cannot be expected to be in the store around the clock. Besides, as the store employees are working in staggered shifts, it is difficult to maintain communication between the employees (including the store manager) in the store.

Among the matters to be communicated within the store, those concerning the work operation must be conveyed smoothly from the store manager going off shift to an employee coming on shift and from the employee going off shift to another employee coming on shift or to the store manager coming on shift. If this communication is not done properly, trouble may occur in the progress of work.

Traditionally, such in-store communication has been carried out by means of a handwritten memo. For example, the store manager going home would leave a memo for the employee coming on shift, and the employee who came to the store after the manager left would see the memo and do the work in accordance with the manager's instructions. The same method is also used when the employee going home reports problems, etc. encountered during the work to the manager.

However, such a memo often tends to be misplaced or lost; furthermore, since the memo is not one presented at the appropriate stage of the work operation, the employee may forget to carry out the instructions written on the memo. For example, consider the case where the store manager has left a message saying "The cherry-blossom season has come. Be sure to order a little more 1.5-liter PET bottles and rice balls than usual" to the employee coming to the store after the manager leaves. In this case, there is no guarantee that the employee who arrives at the store after the manager leaves will see the memo upon arrival, because such a handwritten memo tends to be misplaced somewhere. Furthermore, if the employee did see the memo upon arrival at the store, there is no guarantee that the employee will recall the contents of the memo without fail when he or she orders the merchandise, that is, the PET bottles and rice balls.

In this way, as there is no guarantee that the instructions written on the memo will be communicated to the intended person and carried out without fail, the traditional in-store communication method replying on handwritten memos has not been reliable enough as a means for smoothly carrying out the work operation.

Furthermore, if such memos are accumulated for each store or for all the stores, and the contents of the memos are classified and analyzed at a suitable time, they can provide important know-how information for sales and store management, etc. However, in the prior art, means for accumulating such memos as information has not been available, and the memos have been used only as a temporary information-communication means among employees.

SUMMARY OF THE INVENTION

The present invention has been devised in view of the above situation, and an object of the invention is to provide a novel store system that can achieve smooth communication within a store and improve work efficiency by incorporating various kinds of memos into the store system and organizing them so that they can be centrally managed in a retail system comprising a headquarters and a plurality of chain stores.

To achieve the above object, the present invention provides a store system comprising: a store controller incorporating various kinds of programs for executing sales and sales management tasks; a display for displaying a guide screen for the execution of a task specified by each of the various kinds of programs; first input means for inputting data to the store controller in accordance with an instruction displayed on the screen produced on the display; and second input means for inputting memo information to the store controller, wherein the store controller has a function to request an operator via the display screen to select key information to be appended to the memo information when the operator inputs the memo information via the second input means, and a function to store the memo information, together with the appended key information, in a storage device within the system.

The memo information is input by handwriting or voice via a handwriting input means or a voice input means. Further, when inputting the memo information, key information to be used as a search key is appended to raw data of the memo information and stored in the storage device within the system. The key information includes, for example, an employee code, a task code, a product code, or a suitable combination thereof. By appending the key information to the memo information, it becomes possible to associate the memo information with the work operation within the system, and thus the memo information can be output in a timely fashion at the appropriate stage of the work operation.

For example, when the memo information is one intended for a particular employee, the employee code of that employee is appended as the key information to the memo information and stored in the system. When the employee for whom the memo is intended comes to the store and performs a clock-in registration on the store system (by entering the employee code via a keyboard or by scanning the employee bar code), the system searches through the storage device and, if there is any memo information having the corresponding employee code as the key information, retrieves the memo information and presents it on the display. In this way, upon making the clock-in registration, the memo information can be presented without fail to the intended employee. The memo information may, of course, be presented by means of voice.

On the other hand, when the memo is intended for a particular task, the corresponding task code is appended as the key information to the memo information and stored in the system. When any one employee (including the store manager) selects that task in the system, the system searches through the storage device, retrieves the memo information having the corresponding task code as the key information, and presents the memo information on the display. In this way, when performing the task for which the memo is intended, the memo is presented without fail to the employee who is going to perform the task.

Likewise, when the key information is a product code, the memo is input to and output from the system in the same manner as described above. When the key information is a suitable combination of various kinds of key information, the memo is input to and output from the system in like manner.

When the memo is input by handwriting or voice, the memo can also be converted by an input conversion program into text information for storing in the storage device within the system. In this case, when outputting the memo, recognized character information can be presented for display, rather than presenting the handwritten or voice memo itself.

When the memo information stored as text information in the storage device within the store system has accumulated to a certain amount, the memo information is transmitted to the headquarters where the memo information is classified for each store or across all the stores; by performing various kinds of information processing on the classified results, know-how concerning sales and store management, etc. is extracted, based on how a know-how data base is constructed.

BRIEF DESCRIPTION OF THE DRAWINGS

FIG. 5 is a block diagram showing the software configuration of the store controller of FIG. 3;

FIG. 6 is a block diagram showing the flow of data for inputting memo information;

FIGS. 7A and 7B are diagrams showing the data structure of the memo information;

FIG. 26 is a diagram showing one example of a display screen, and more specifically an example of a screen (A-6) for appending key information to the memo information;

FIG. 27 is a diagram showing one example of a display screen, and more specifically an example of a screen (A-7) for appending information concerning a display period to the memo information;

FIG. 28 is a diagram showing one example of a display screen, and more specifically an example of a clock-in registration screen (B-1);

FIG. 31 is a diagram showing one example of a display screen, and more specifically a screen (B-4) for performing an order task.

DESCRIPTION OF THE PREFERRED EMBODIMENTS

Figure 1:
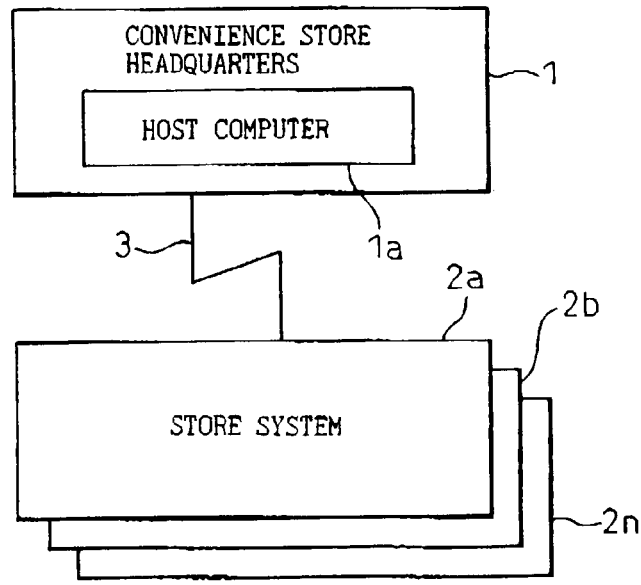
FIG. 1 is a block diagram showing the configuration of a convenience store system.

FIG. 1 is a block diagram showing the configuration of a convenience store system as one example of a retail system to which the present invention is applied. A plurality of convenience stores (retail stores, i.e., chain stores) 2a, 2b, . . . , 2n are each linked via a communication line 3 to a convenience store headquarters 1 having a host computer 1a. The convenience stores 2a to 2n are each equipped with a store system having basically the same configuration. Master registration, etc. of each store system is performed at the convenience store headquarters 1 connected via the communication line.

Figure 2:
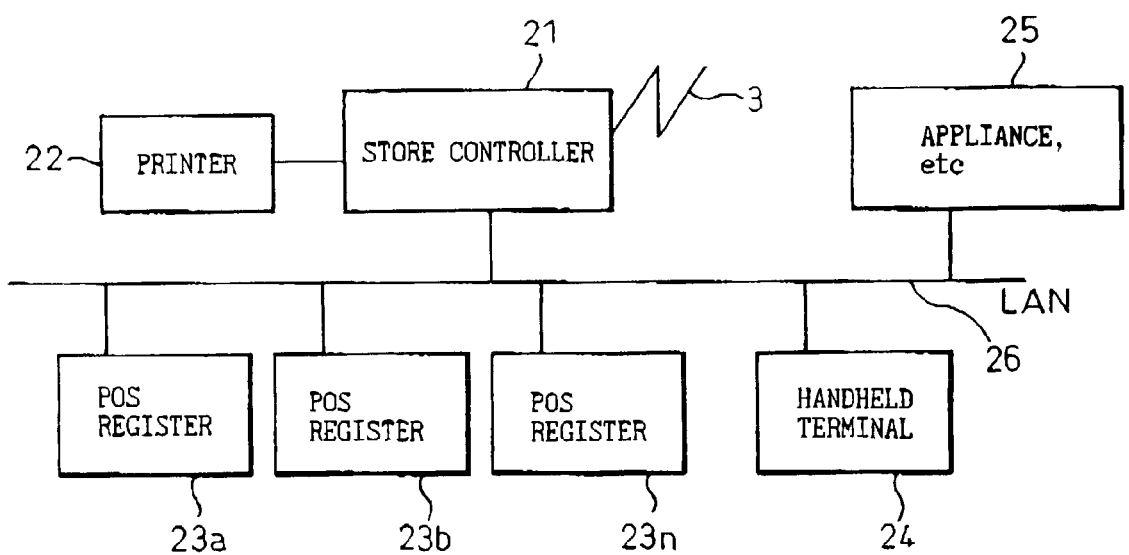
FIG. 2 is a block diagram showing the configuration of a store system.

FIG. 2 is a block diagram showing the configuration of the store system. In the store system, a store controller 21 to which a printer 22 is connected, POS registers 23a, 23b, . . . , 23n, handheld terminals 24, appliances 25, etc. are connected via a LAN 25. The store controller 21 is connected to the convenience store headquarters 1 via the communication line 3.

Figure 3:
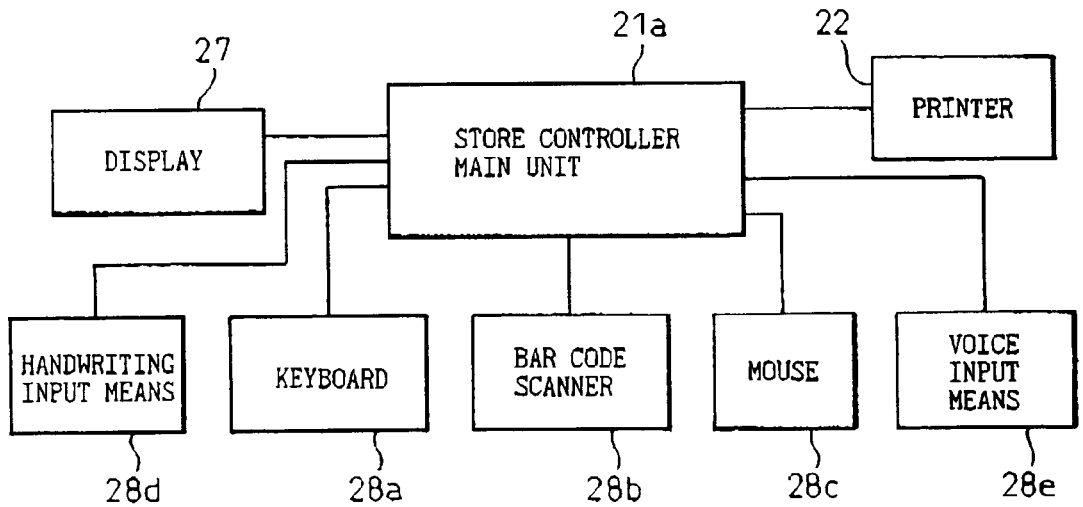
FIG. 3 is a block diagram showing connections to a store controller contained in the store system of FIG. 2.

FIG. 3 is a block diagram showing connections to the store controller 21. In addition to the printer 22, a display 27 is connected to the store controller main unit 21a to which are also connected input means such as a keyboard 28a, a bar code scanner 28b, and a mouse 28c. To input memo information according to the present invention, there are also connected a handwriting input means 28d and a voice input means 28e. Either the handwriting input means or the voice input means need be provided. Though not shown here, a touch input means may be provided on the display 27.

Figure 4:
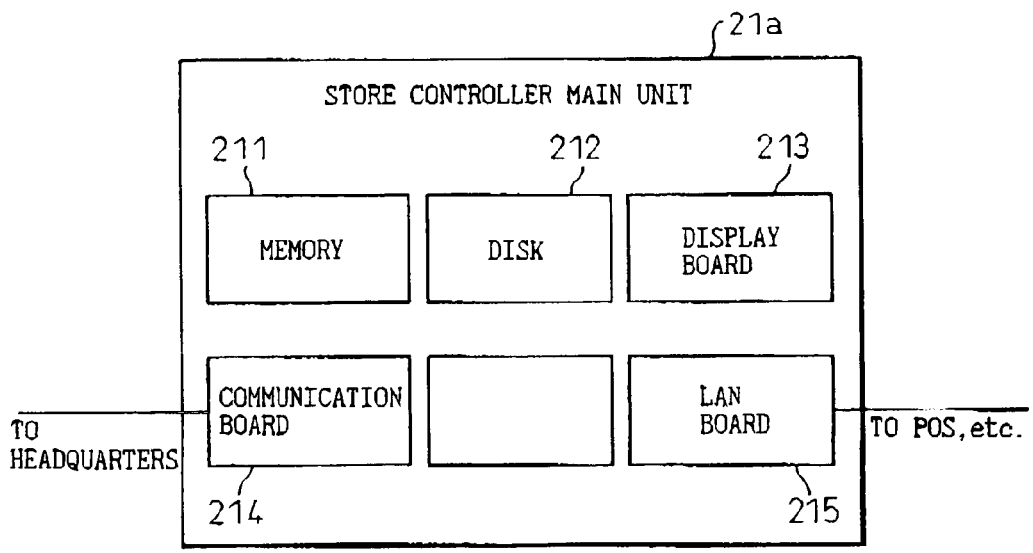
FIG. 4 is a block diagram showing the configuration of the store controller of FIG. 3.

FIG. 4 shows the internal configuration of the store controller main unit 21*a*. The main unit 21*a* contains a memory 211, a hard disk 212, and a display board 213, as in a conventional computer system; the main unit 21*a* further contains a communication board 214 for communication with the convenience store headquarters, and a LAN board 215 for connection to each POS register, appliance, etc.

FIG. 5 is a diagram showing the software configuration of the store controller. As shown, the store controller contains various control programs 200*a* for performing main tasks as the store controller, and business application programs 200*b* for performing various business tasks as the convenience store. The control programs include, as shown, programs for controlling various input/output devices, programs for performing communications, and a communication management task program 200*c* for carrying out the present invention.

The operation of the store system having the above configuration will be described below for the input and output of memo information.

FIG. 6 is a block diagram showing the flow of data when inputting memo information (a message) to the store system. When an employee (operator) using the mouse or the like selects a memo input button displayed on the display 27, the resulting information is input into the store controller 21, and the communication management task program 200*c* is activated. Raw data of the memo information entered by handwriting via the handwriting input means is appended with key information in accordance with an instruction from the communication management task program 200*c*, and is stored as communication information data in a storage area provided, for example, within the hard disk 212. If necessary, text information is appended to the communication information data by using an input conversion program 201 which converts the handwritten information into the text information. When the memo information to be input is a voice memo, an input conversion program for converting voice information into text information is used.

FIG. 7 shows one example of the data structure of the communication information data created in the above manner. As shown in FIG. 7A, the memo data comprises a header 60, a text data field (TEXT) 70 carrying the memo contents converted into text data, and a raw data field (RAW) 80 carrying the raw data of the input memo contents.

The structure of the header 60 is shown in FIG. 7B. Reference numeral 60*a* indicates a memo number which is the number (main key) used for uniquely managing the memo, and 60*b* an operator code identifying the employee who entered the memo. Reference numeral 60*c* is a key designating section which designates the key combination used. Reference numerals 60*d*, 60*e*, and 60*f* are sections indicating an employee code, a product code, and a task code, respectively, as key items. The employee code 60*d* is a code identifying a particular employee when the memo is intended for that particular employee, the product code 60*e* is a code identifying a particular product when the memo is intended for that particular product, and the task code 60*f* is a code identifying a particular task when the memo is intended for that particular task.

Reference numeral 60*g* indicates the date and time of the input, and 60*h* is a date designating section which designates the date by which the information is to be presented. If the information is to be presented on the same date as the input date, the same date is stored in this section. Reference numeral 60*i* indicates a data validity date which designates the validity date for the memo data (that is, the date at which the data is to be deleted). Reference numeral 60*j* is a reply needed/not-needed section for indicating whether a reply to the memo is needed or not. If this section is ON and no reply is received, the memo is output for presentation until the data validity date arrives.

Reference numeral 60*k* is a completion section for indicating whether the memo information has been presented or not. Reference numeral 60*l* indicates the information presented date, i.e., the date at which the memo information was presented. Reference numeral 60*n* indicates a related memo number which is, for example, the memo number of a reply memo.

Figure 8:
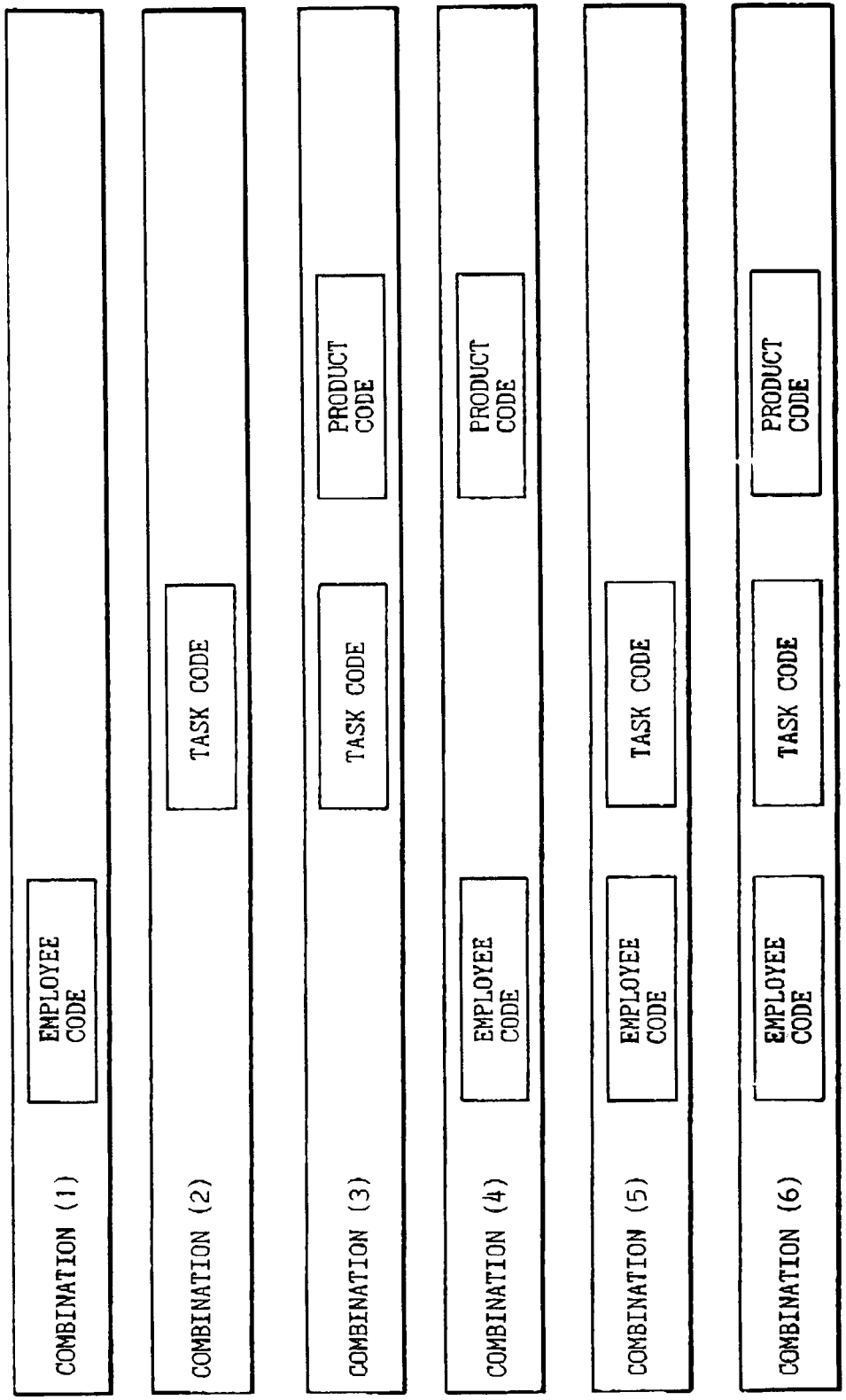
FIG. 8 is a diagram showing combinations of key information.

FIG. 8 shows key information combinations. One of these combinations is selected and entered in the key designating section 60*c* in FIG. 7B.

In one embodiment of the present invention, 1) employee key, 2) task key, and 3) product key are used as the search key information to be appended to the communication data, as earlier described. These keys are used singly or in a suitable combination. There are six possible combinations (1) to (6) as shown. Here, the product code cannot be specified by itself because, with the product code alone, the display task cannot be identified.

Figure 9:
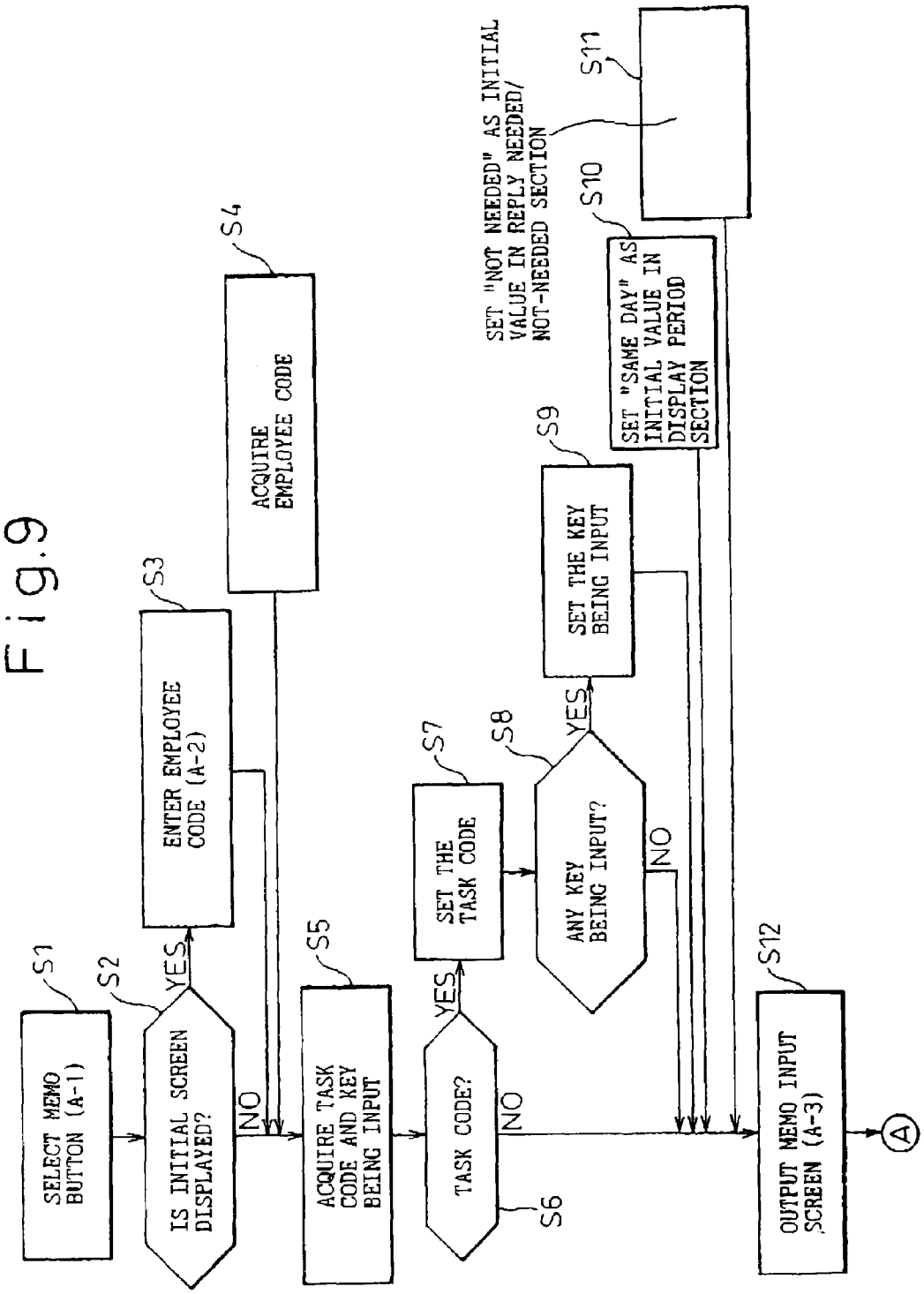
FIG. 9 shows the first half of a flowchart illustrating the memo information input process.

The processing flow to be carried out by the communication management task program 200*c* when inputting the memo information according to the present embodiment will be described below with reference to the flowchart of FIGS. 9 and 10 and the display screen examples of FIGS. 21 to 27 used when inputting a memo.

Figure 21:
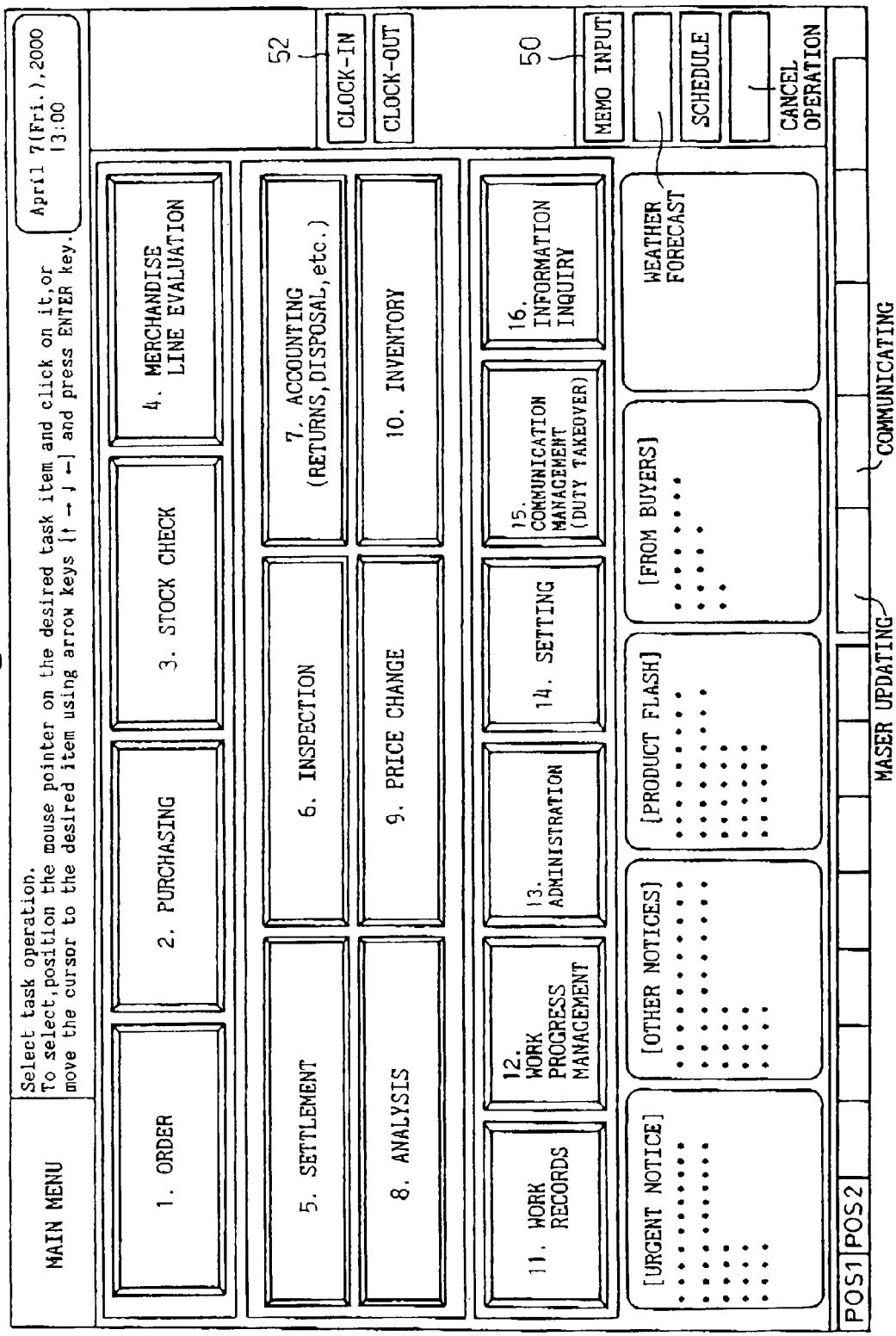
FIG. 21 is a diagram showing one example of a display screen, and more specifically an initial screen (A-1)
Figure 22:
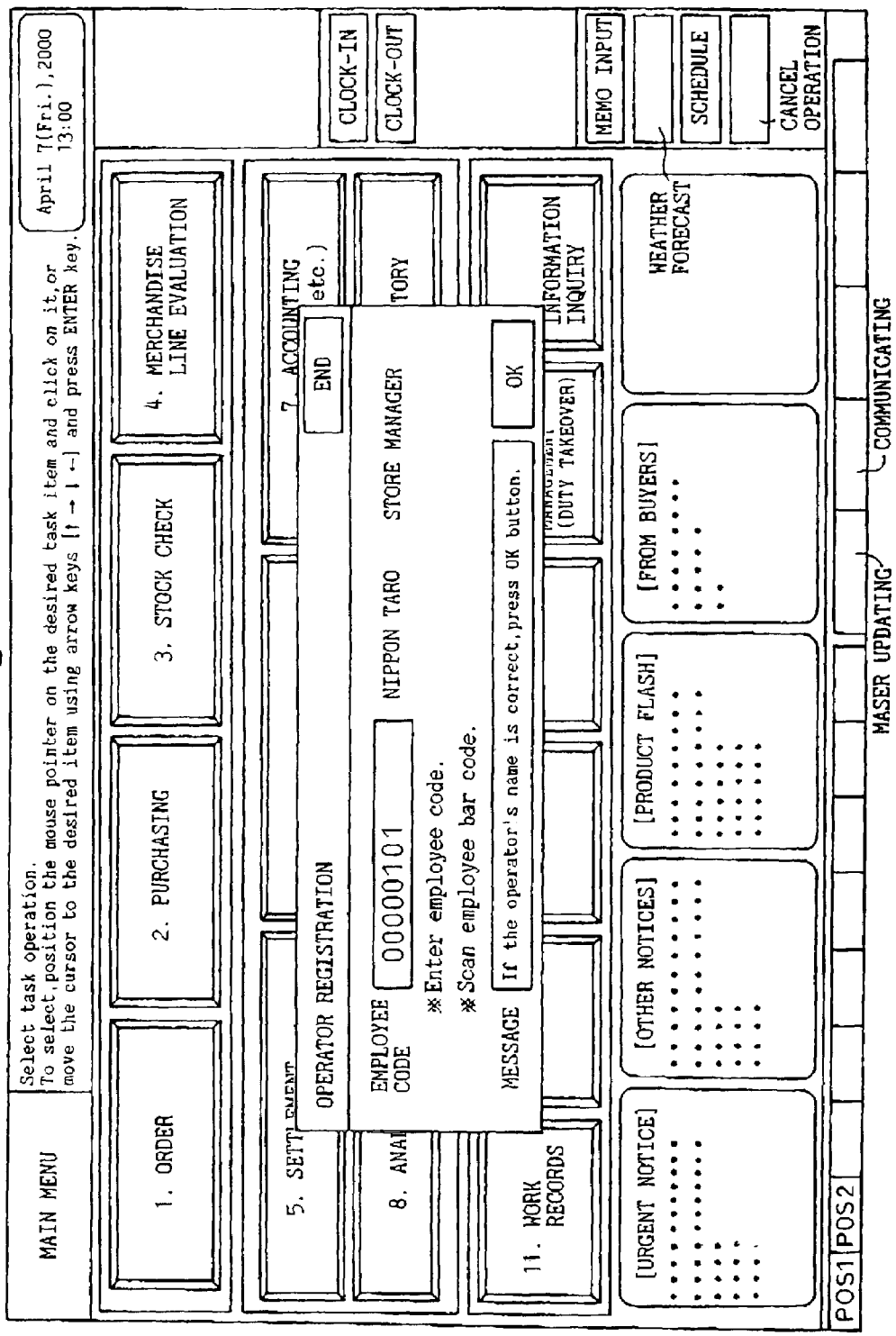
FIG. 22 is a diagram showing one example of a display screen, and more specifically an employee registration screen (A-2)

FIG. 21 shows the initial screen (A-1) produced on the display 27. When inputting a memo, a "MEMO INPUT" button 50 on the screen is selected in step S1 in FIG. 9. The various buttons (selection buttons) on the display screen can be selected using such input means as a touch input, a light pen input, a mouse click, or a keyboard input; in the system of the present invention, any of such input means can be used. However, the embodiment described hereinafter shows the case in which the button selection is made using a mouse or a keyboard.

The selection of a task is made on the initial screen (A-1). When the selection is made, a task screen (for example, the screen (B-4) to be described later) is brought onto the display. In the present embodiment, the operator code (employee code) must be entered before the task screen can be displayed.

When the MEMO button 50 is selected on either the initial screen or the task screen in order to input memo information (step S1 in FIG. 9), it is determined in step S2 whether the initial screen is displayed on the display 27. When the screen displayed is the initial screen (A-1) shown in FIG. 21 (YES in step S2), the display changes to the screen (A-2) shown in FIG. 22, and a window prompting the operator to input his or her employee code pops up on the initial screen. In the pop-up window, the employee enters his or her own code by using the keyboard or the bar code scanner (step S3).

On the other hand, when the screen displayed is the task screen, this means that the employee code is already input as the application for the task selected on the initial screen is running. Therefore, the communication management task program acquires the employee code (step S4)

Next, in step S5, the code of the currently running task application and the key being input are acquired. If there is a task code (YES in step S6), the task code is set (step S7), and it is determined whether there is a key item being input (step S8). If there is a key item being input (YES in step S8), the key being input is set (step S9). This key item is, for example, the product code of the product at which the cursor is positioned on the display screen.

Figure 23:
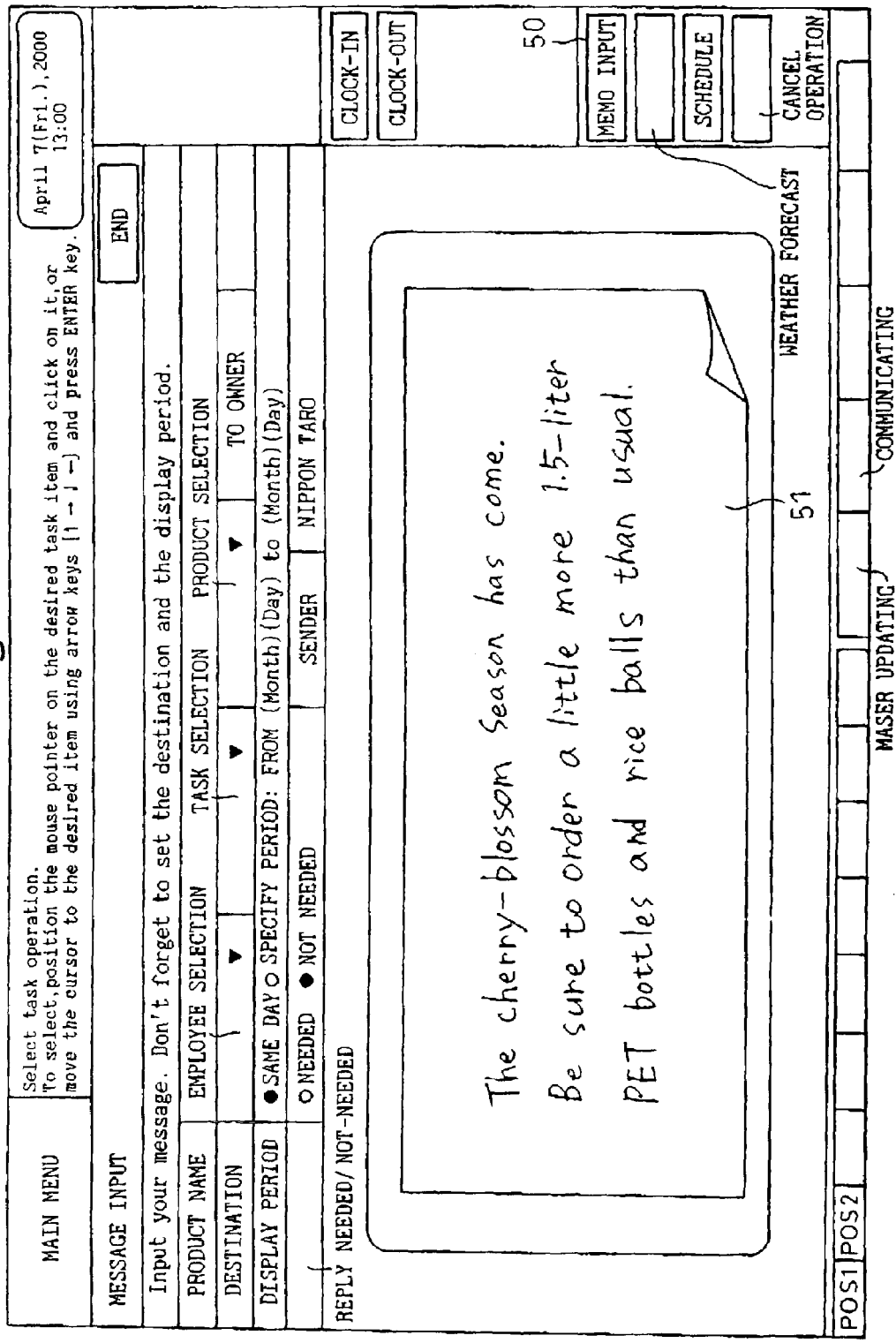
FIG. 23 is a diagram showing one example of a display screen, and more specifically an example of a memo information input screen (A-3)

Further, "SAME DAY" is set as the initial value in the display period section (step S10), and "NOT NEEDED" is set as the initial value in the reply needed/not-needed section (step S11). Thereafter, the process proceeds to step S12 where the memo input screen (A-3) shown in FIG. 23 is produced on the display.

If the answer is NO in step S6, that is, if there is no task code, there is no need to acquire the task code key or the key being input because, in this case, the screen displayed is the initial screen. When the mouse is clicked on the OK button on the screen (A-2) shown in FIG. 22, the memo input screen (A-3) shown in FIG. 23 pops up on the display (step S12). Here, the initial values "SAME DAY" and "NOT NEEDED" acquired in steps S10 and S11 are shown on the screen.

Figure 10:
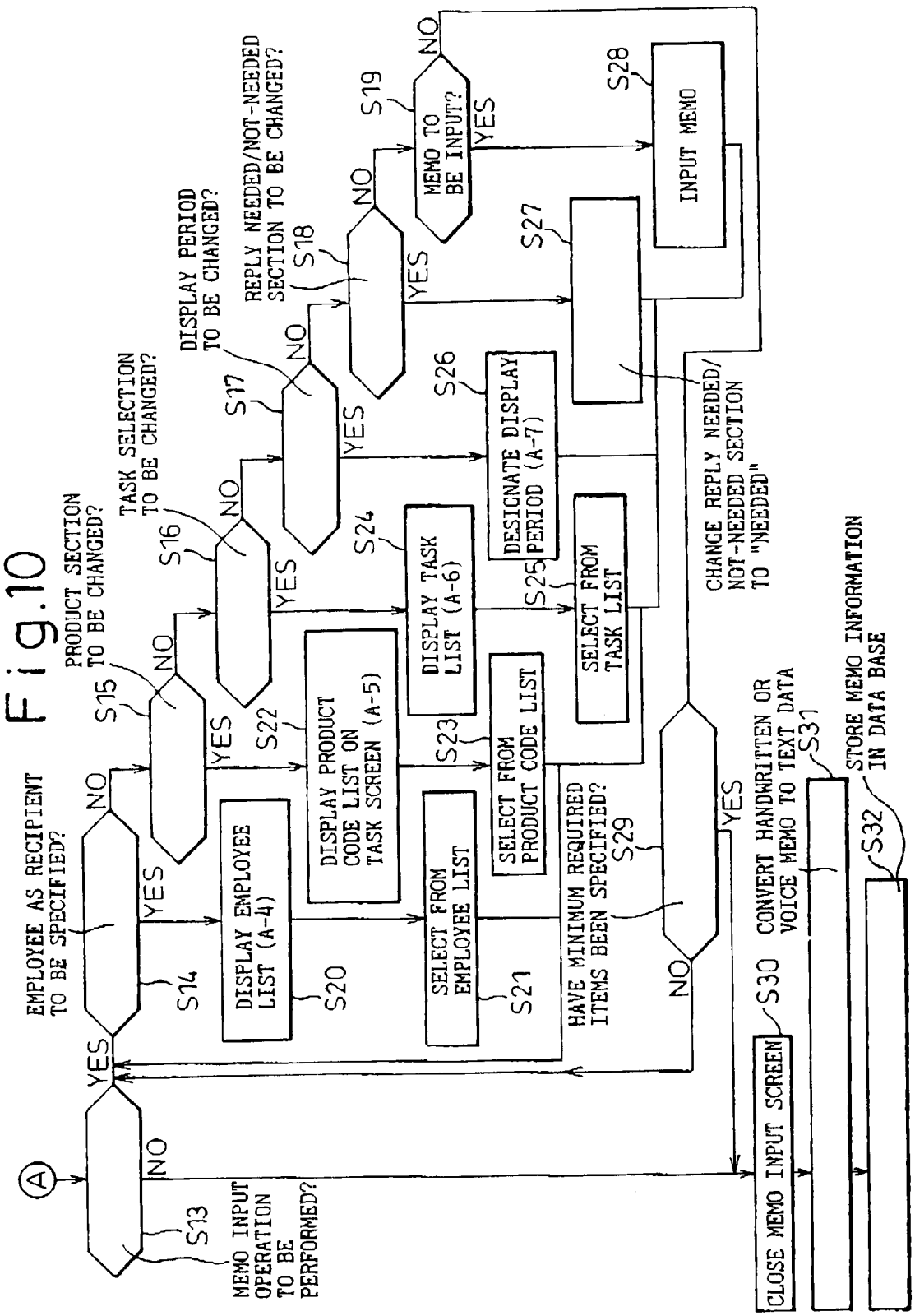
FIG. 10 shows the second half of the flowchart, which is a continuation of the memo information input process shown in FIG. 9.

Next, as shown in FIG. 10, it is determined in step S13 whether the memo input operation is to be performed or not. When the memo input operation is to be performed (YES in step S13), then it is determined in step S14 whether the employee as the recipient of the memo is to be specified or not, in step S15 whether the product selection is to be changed or not, in step S16 whether the task selection is to be changed or not, in step S17 whether the display period is to be changed or not, in step S18 whether the reply needed/not-needed section is to be changed or not, and in step S19 whether the memo is to be input or not. Here, steps S14 to S19 can be carried out in any order.

Figure 24:
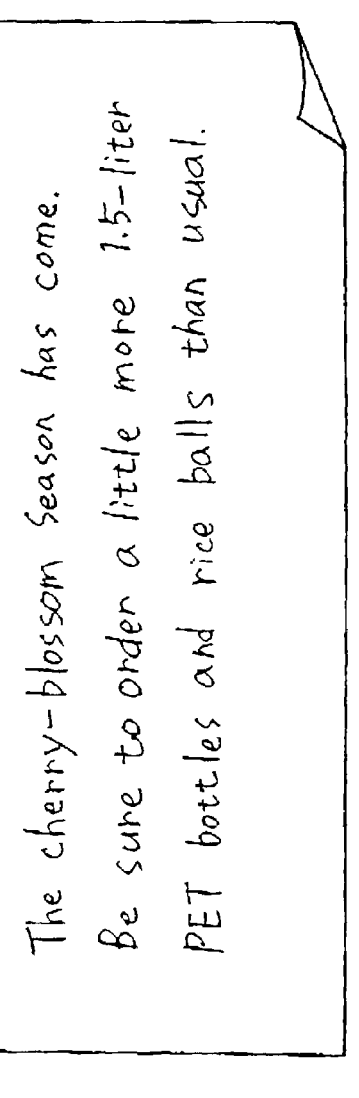
FIG. 24 is a diagram showing one example of a display screen, and more specifically an example of a screen (A-4) for appending key information to the memo information.
Figure 25:
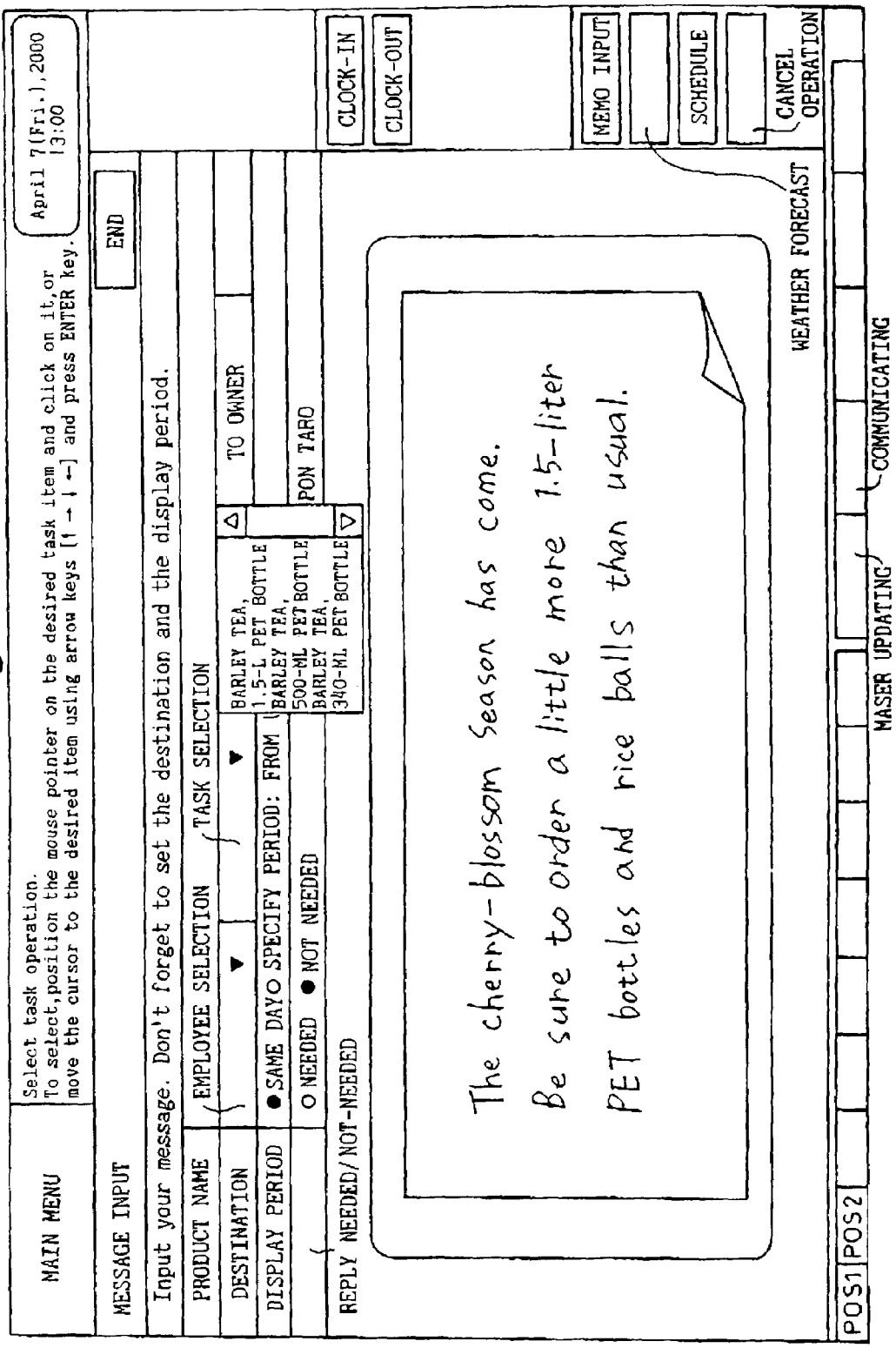
FIG. 25 is a diagram showing one example of a display screen, and more specifically an example of a screen (A-5) for appending key information to the memo information.

If the answer is YES in step S14, an employee list from which to select the recipient of the memo appears as shown on the screen (A-4) of FIG. 24 when the employee selection button is selected (step S20). In step S21, the employee as the recipient is selected from the list. Next, if the product selection is to be changed in step S15 (YES in step S15), a list of products that can be selected appears as shown on the screen (A-5) of FIG. 25 when the product selection button is selected (step S22). Therefore, in step S23, the product for which the memo is intended is selected from the product list.

If the task is to be changed in step S16 (YES in step S16), a list of tasks that can be selected appears as shown on the display (A-6) of FIG. 26 when the task selection button is selected on the screen (step S24); therefore, the task to be selected is input by clicking on it (step S25).

If the display period is to be changed in step S17 (YES in step S17), the period to be specified is input as shown on the screen (A-7) of FIG. 27 (step S26). If the reply needed/not-needed section is to be changed in step S18 (YES in step S18), the REPLY NEEDED button is clicked (step S27). If the memo (message) is to be input in step S19, the memo is written by hand on a handwriting input area 51, or the already written memo is modified (step S28).

When the handwritten message and the key information and other necessary information to be appended to the message are input on the memo input screen as described above then, in step S29, the program checks whether the minimum required items have been specified or not; if YES, the memo input screen is closed in step S30. Thereafter, if necessary, in step S31 the handwritten memo or voice memo is converted into text information by the input conversion program, to construct the memo information of the structure shown in FIG. 7. In step S32, this memo information is stored in a data base on the hard disk.

Next, a description will be given of how the memo is output and utilized.

Figure 11:
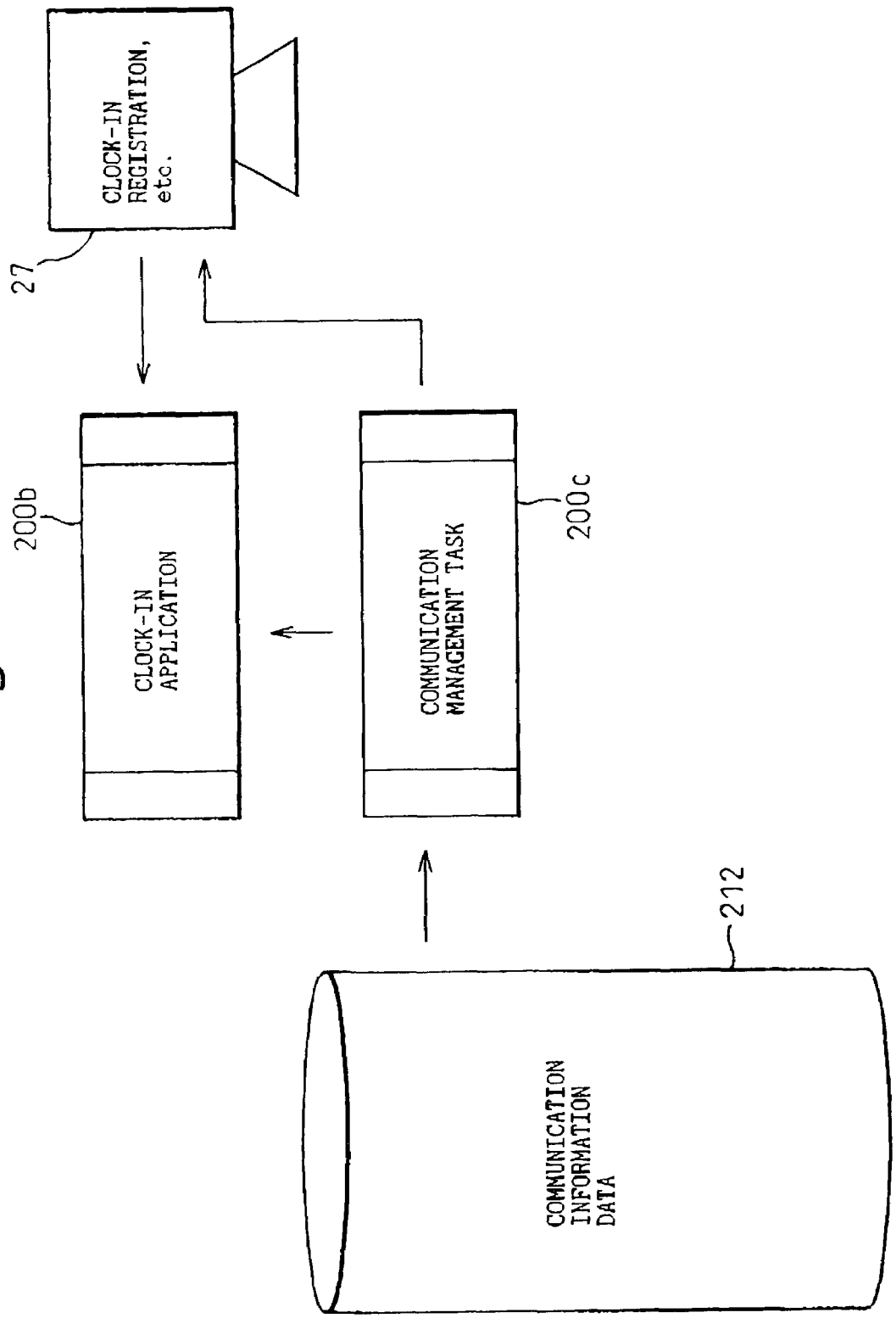
FIG. 11 is a diagram showing one example of the flow of data when outputting the memo information.
Figure 12:
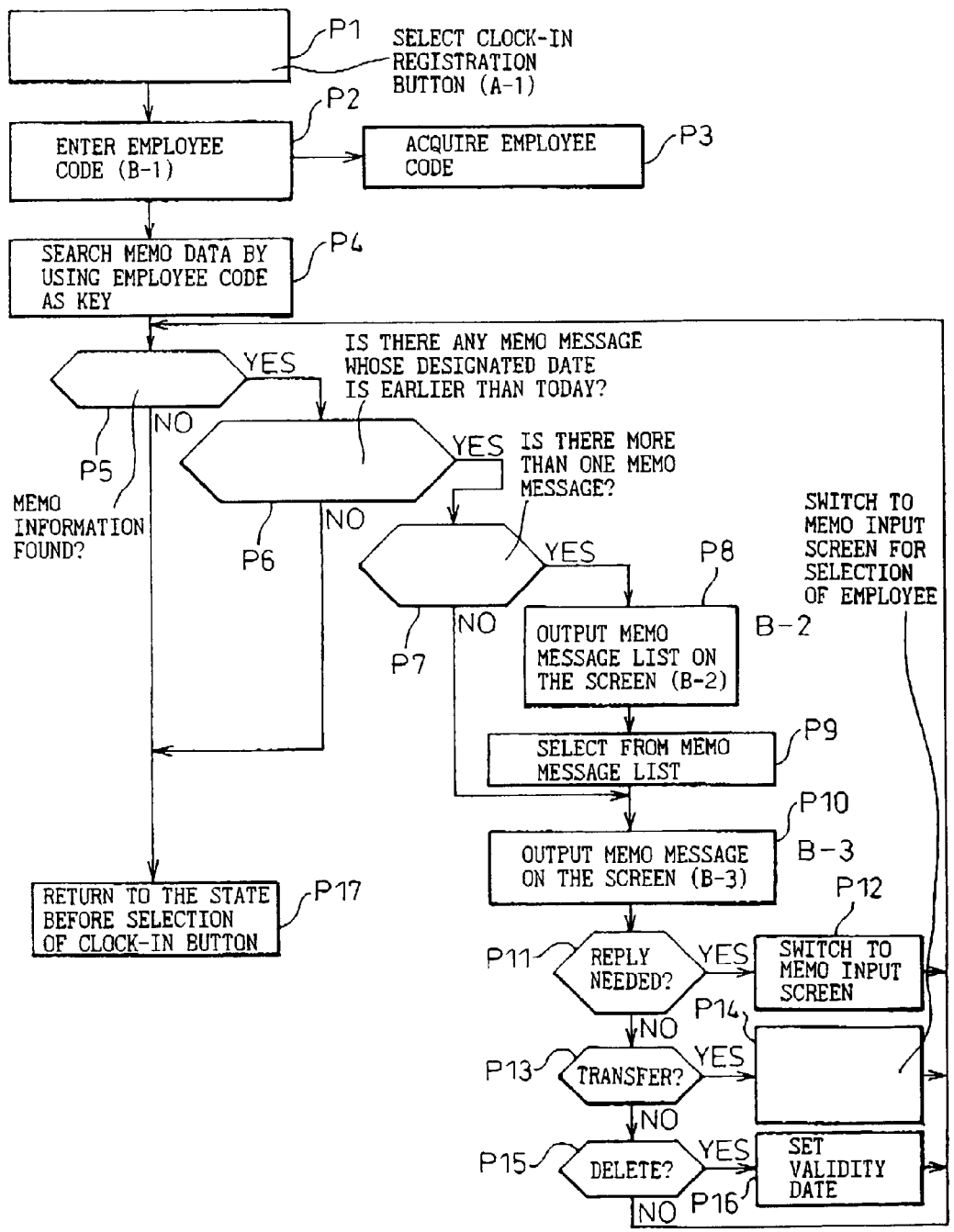
FIG. 12 is a flowchart illustrating the memo information output process shown in FIG. 11.

FIG. 11 is a block diagram showing the flow of data when utilizing the information with the employee code as the key information. FIG. 12 is a flowchart illustrating the processing flow in that case.

When an employee clocks in or clocks out, the store system activates a clock-in registration application or a clock-out registration application to record the clocking in or clocking out of the employee. The activation of the application is done by selecting the CLOCK-IN or CLOCK-OUT registration button on the display screen.

For example, when the CLOCK-IN registration button 52 is selected on the initial screen (A-1) (step P1), a clock-in registration window pops up on the initial screen as shown on the display screen (B-1) of FIG. 28. When an employee code is entered in the pop-up window (step P2), the communication management task program 200c is activated and the employee code is acquired (step P3). Next, the communication management task program 200c searches the communication information data base on the hard disk 212 by using the acquired employee code as the key (step P4).

When the matching memo information is found as a result of the search (YES in step P5), the communication management task program displays the handwritten message in a pop-up fashion by carrying out the following steps.

Figure 29:
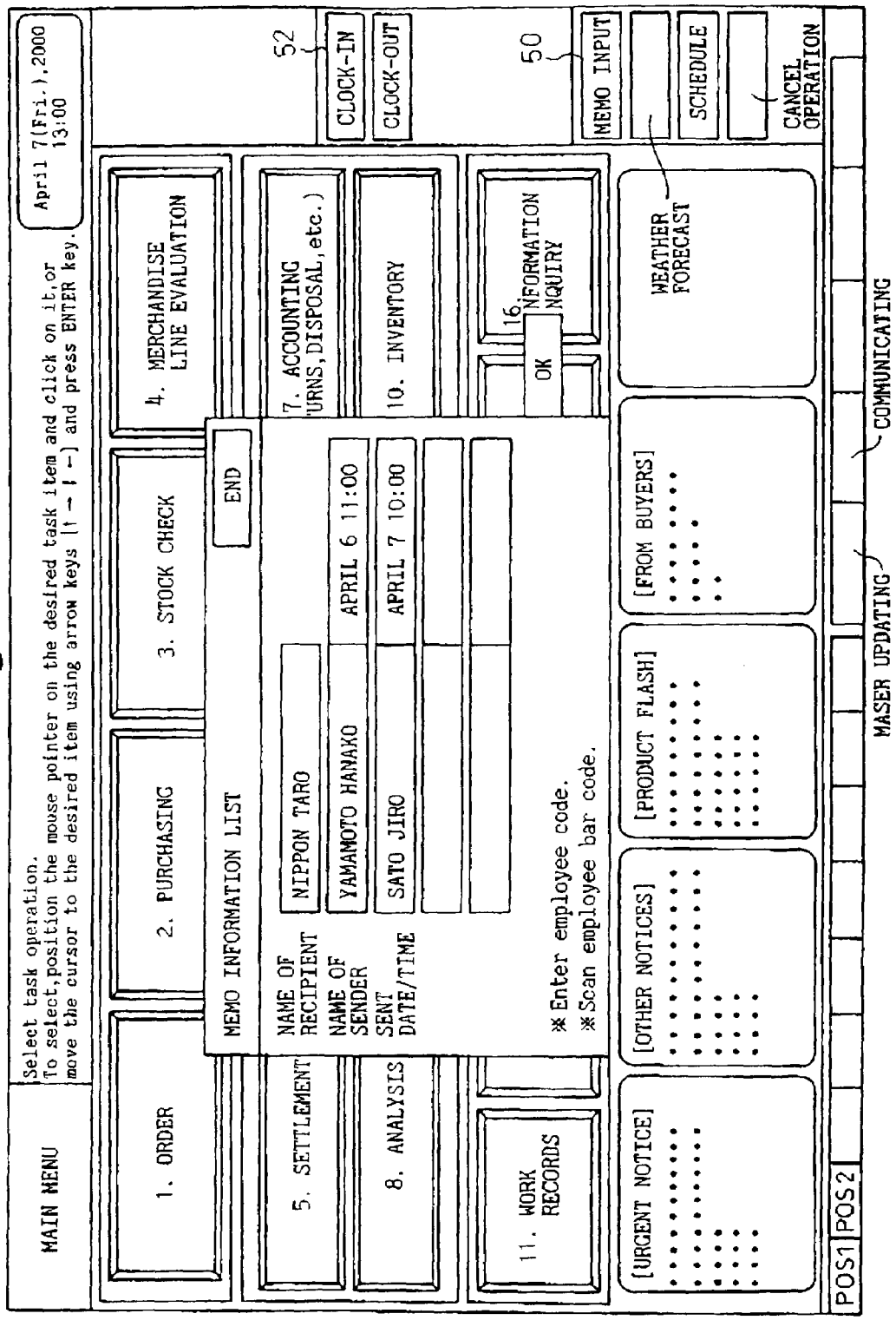
FIG. 29 is a diagram showing one example of a display screen, and more specifically a screen (B-2) showing a list of memo information.
Figure 30:
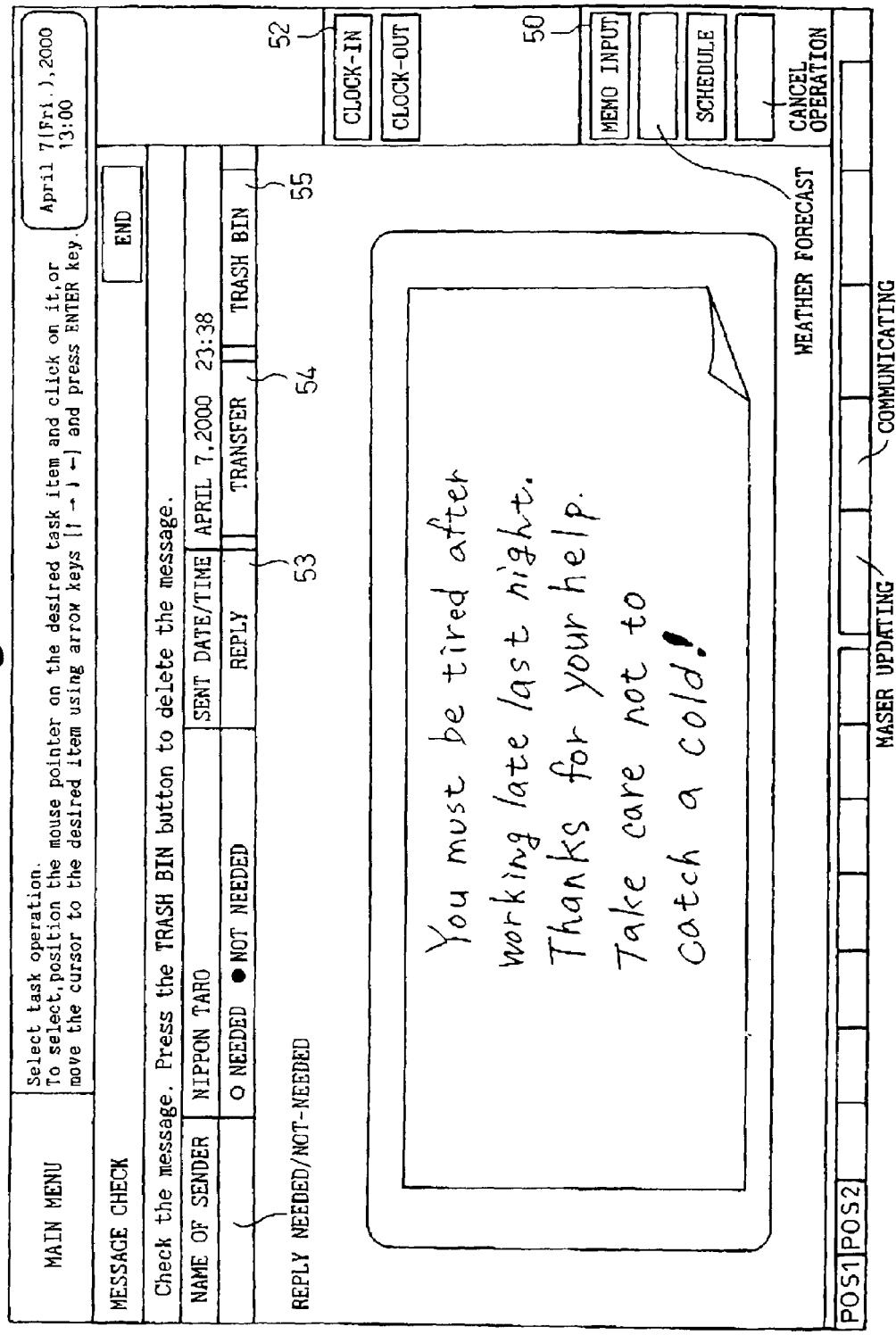
FIG. 30 is a diagram showing one example of a display screen, and more specifically a memo information output screen (B-3)

First, it is determined whether there is any message whose designated date is earlier than today (step P6); if YES, then it is determined in step P7 whether there is more than one memo message. If there is more than one memo message (YES in step P7), a list of the corresponding memo messages is displayed in step P8 on the display screen (the screen (B-2) of FIG. 29). When a memo is selected from the list on the screen (B-2) (step P9), the contents of the memo appear in a pop-up fashion on the screen of the display 27 (the screen (B-3) of FIG. 30, step P10). On the other hand, if the answer in step P7 is NO, that is, if there is only one memo message, the process jumps from step P7 to step P10.

Next, the communication management task program interprets the instruction that the employee issued by operating a desired one of the various selection buttons on the screen (B-3), and performs the necessary processing in accordance with the interpretation. For example, it is determined in step P11 whether the REPLY button 53 is selected or not; if YES (the button is selected), the display screen is switched to the memo input screen (step P12), and when the reply memo input operation is completed, the process returns to step P5. Further, it is determined whether the TRANSFER button 54 is selected or not (step P13); if it is selected (YES), the display screen is switched to the memo input screen (step P14) to enable the selection of an employee to whom the message is to be transferred.

Further, it is determined whether the TRASH BIN button 55 is operated or not (step P15); if it is selected (YES), the display screen is switched to the memo input screen (step P16) to enable the operator to change the validity date.

When the above processing is completed, the process returns to step P5 to check whether there is any other memo message remaining; when it is confirmed that there is no message remaining, the screen is switched back to the initial screen, i.e., the display state before the selection of the CLOCK-IN registration button (step P17).

Figure 13:
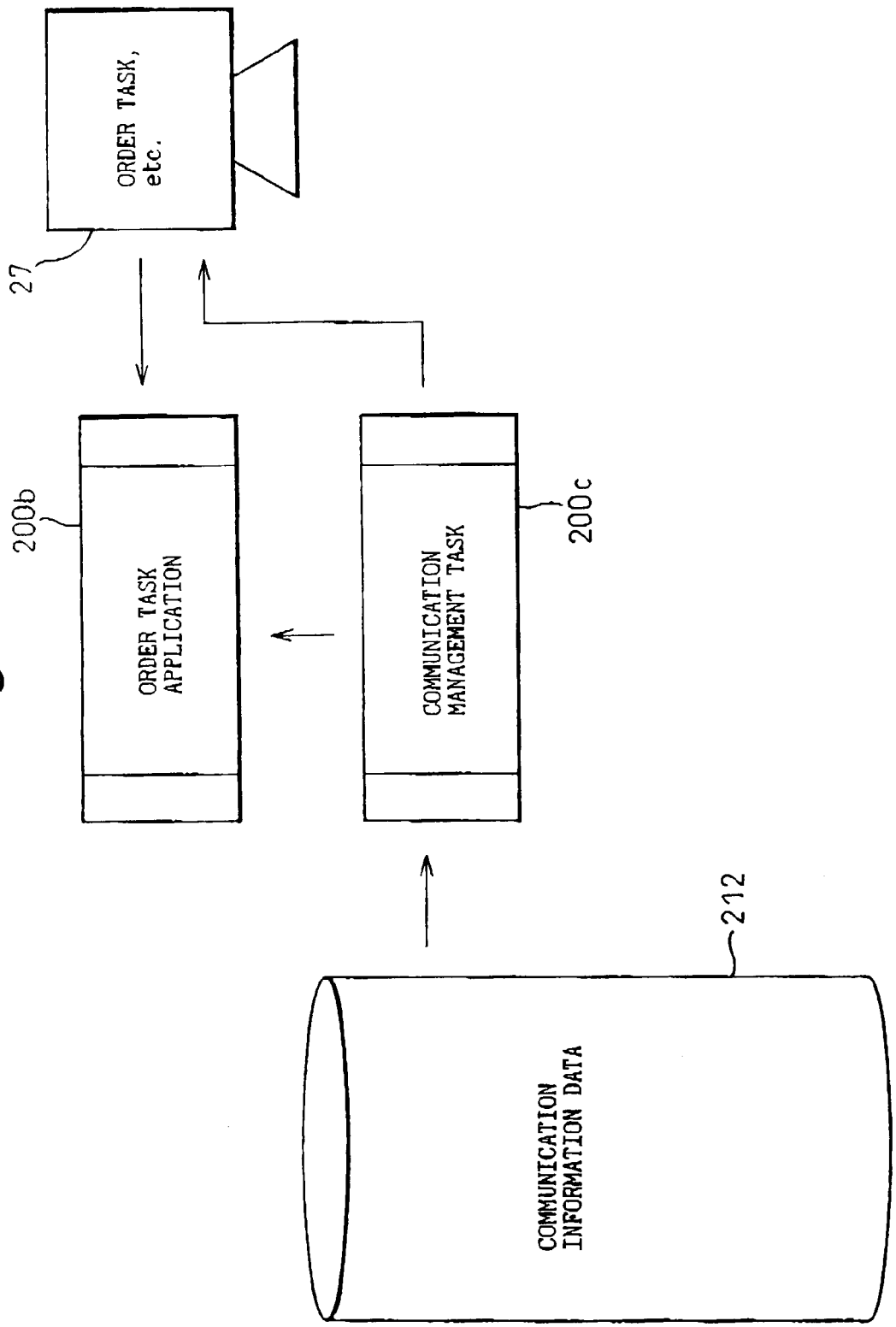
FIG. 13 is a diagram showing another example of the flow of data when outputting the memo information.
Figure 14:
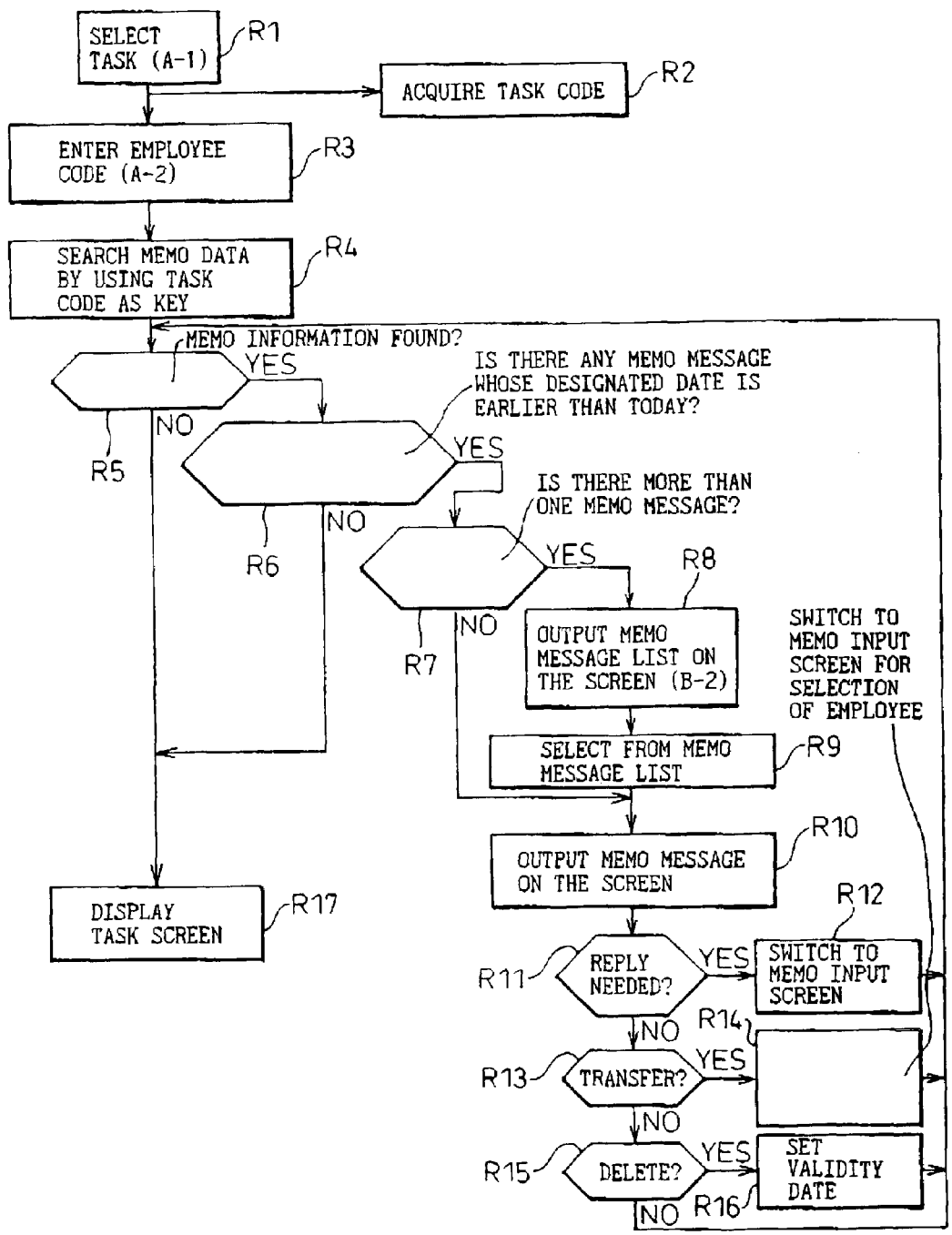
FIG. 14 is a flowchart illustrating the memo information output process shown in FIG. 13.

FIG. 13 is a block diagram showing the flow of data when the key appended to the memo information at the time of the memo input is a task code, and FIG. 14 is a flowchart illustrating the processing flow in that case. First, when the desired task selection button (for example, the ORDER task) is selected on the initial screen (A-1) displayed on the display 27 (step R1), the corresponding task application is activated and, at the same time, the communication management task program 200c is activated and automatically acquires the task code (step R2). Thereupon, the display screen changes to the screen (A-2) to enable the employee code to be entered (step R3). When the employee code is entered, the communication management task program searches the communication information data base on the hard disk 212 by using the acquired task code as the key (step R4).

Steps R5 to R16 to be performed after the memo data searching are the same as the corresponding steps P5 to P16 in the processing flow of FIG. 12 performed using the employee code as the key, and therefore will not be described here.

When all the processing for the output of the memo is completed, the display screen is switched in step R17 to a screen for executing the task selected in step R1. An example of the screen when the task selected in step R1 is the ORDER task for ordering rice balls is shown in the screen (B-4) of FIG. 31.

Figure 15:
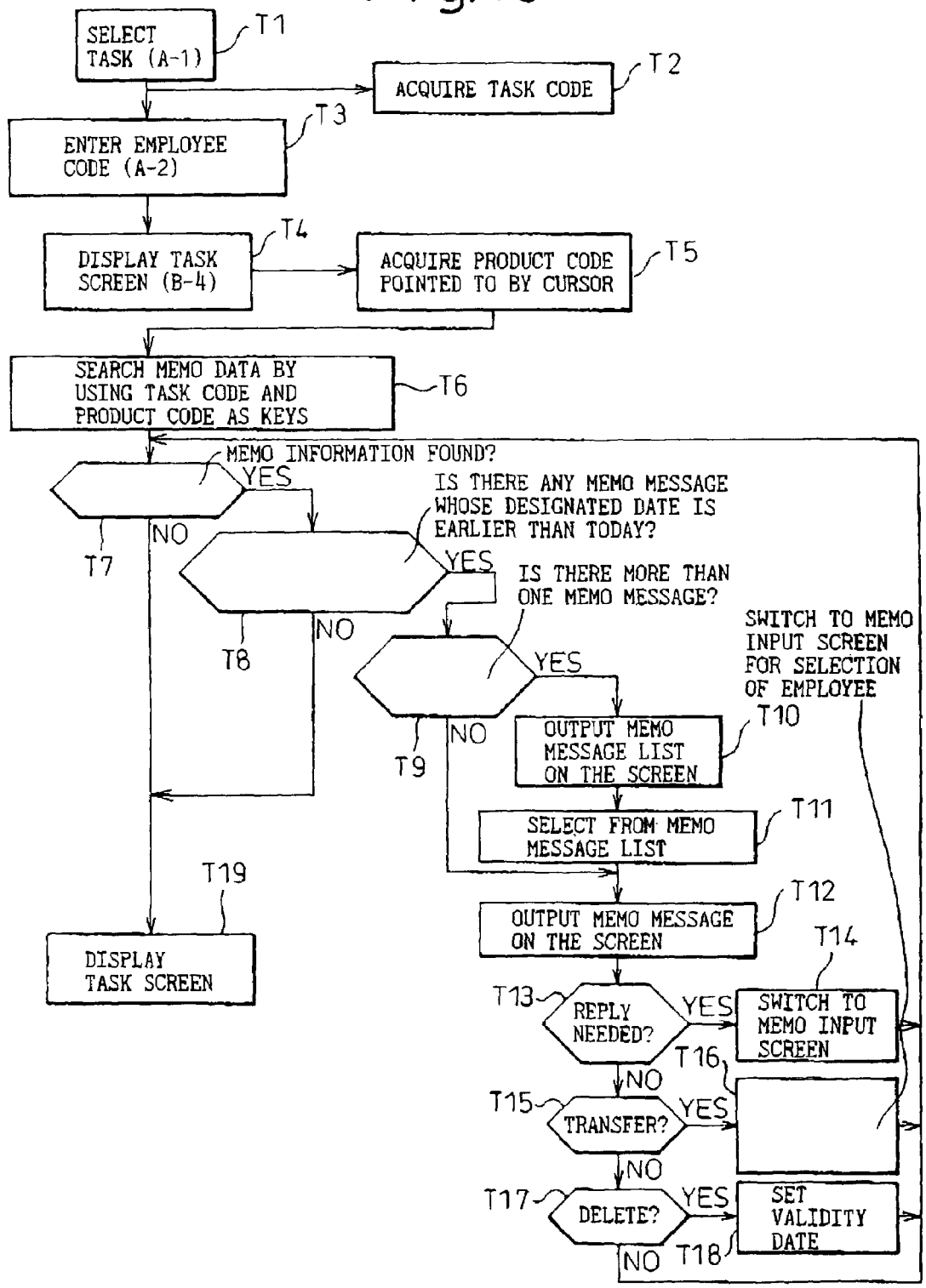
FIG. 15 shows a flowchart illustrating another example of the memo information output process.

FIG. 15 is a diagram showing the processing flow when the keys set at the time of the memo input are a task code and a product code. First, when the desired task selection button is operated on the initial screen (A-1) (step T1), the corresponding task application is activated and, at the same time, the communication management task program is activated and automatically acquires the task code (step T2). Thereupon, the display screen changes to the screen (A-2) to enable the employee code to be entered (step T3).

When the employee code is entered, the display screen changes in step T4 to the task screen (for example, the screen B-4). On this task screen, when the employee positions the cursor at a product code as part of the task performing operation, the communication management task program automatically acquires the product code (step T5). When the task code and the product code are both acquired in this manner, the communication management task program automatically starts to search the memo data by using these codes as the search key information (step T6).

Steps T7 to T18 to be performed after the memo data searching are the same as the corresponding steps P5 to P16 in the processing flow of FIG. 12 performed using the employee code as the key, and therefore will not be described here.

When all the processing for the output of the memo is completed, the process returns to step T7 and, after confirming that there is no other memo information remaining, the display screen is switched to a screen for executing the task selected in step T1 (step T19).

Figure 16:
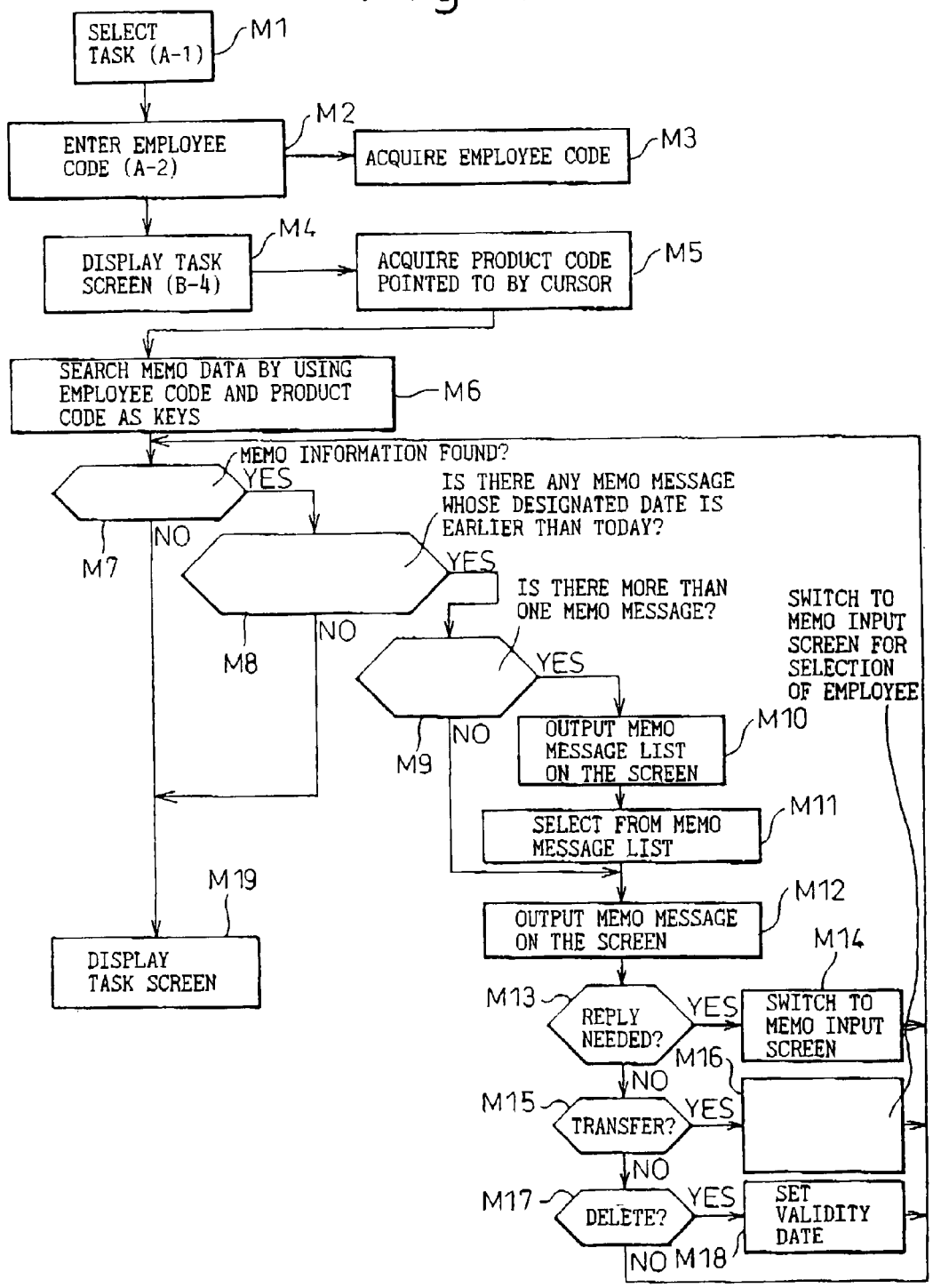
FIG. 16 shows a flowchart illustrating still another example of the memo information output process.

FIG. 16 is a diagram showing the processing flow when the keys set at the time of the memo input are an employee code and a product code. First, when the desired task selection button is operated on the initial screen (A-1) (step M1), the display screen changes to the screen (A-2) (step M2) to enable the employee code to be entered; at the same time, the communication management task program is activated and automatically acquires the employee code (step M3).

When the entry and acquisition of the employee code is completed, the display screen is switched in step M4 to the task screen. The screen (B-4) is one example of the task screen. On this task screen, when the employee positions the cursor at a product code as part of the task performing operation, the communication management task program automatically acquires the product code (step M5). When the task code and the product code are both acquired in this manner, the communication management task program 200c starts to search the memo data on the hard disk 212 by using these codes as the keys (step M6).

Steps M7 to M18 to be performed after the memo data searching are the same as the corresponding steps P5 to P16 in the processing flow of FIG. 12 performed using the employee code as the key, and therefore will not be described here.

When all the processing for the output of the memo is completed, the process returns to step M7 and, after confirming that there is no other memo information remaining, the task screen is displayed on the display in step M19.

Figure 17:
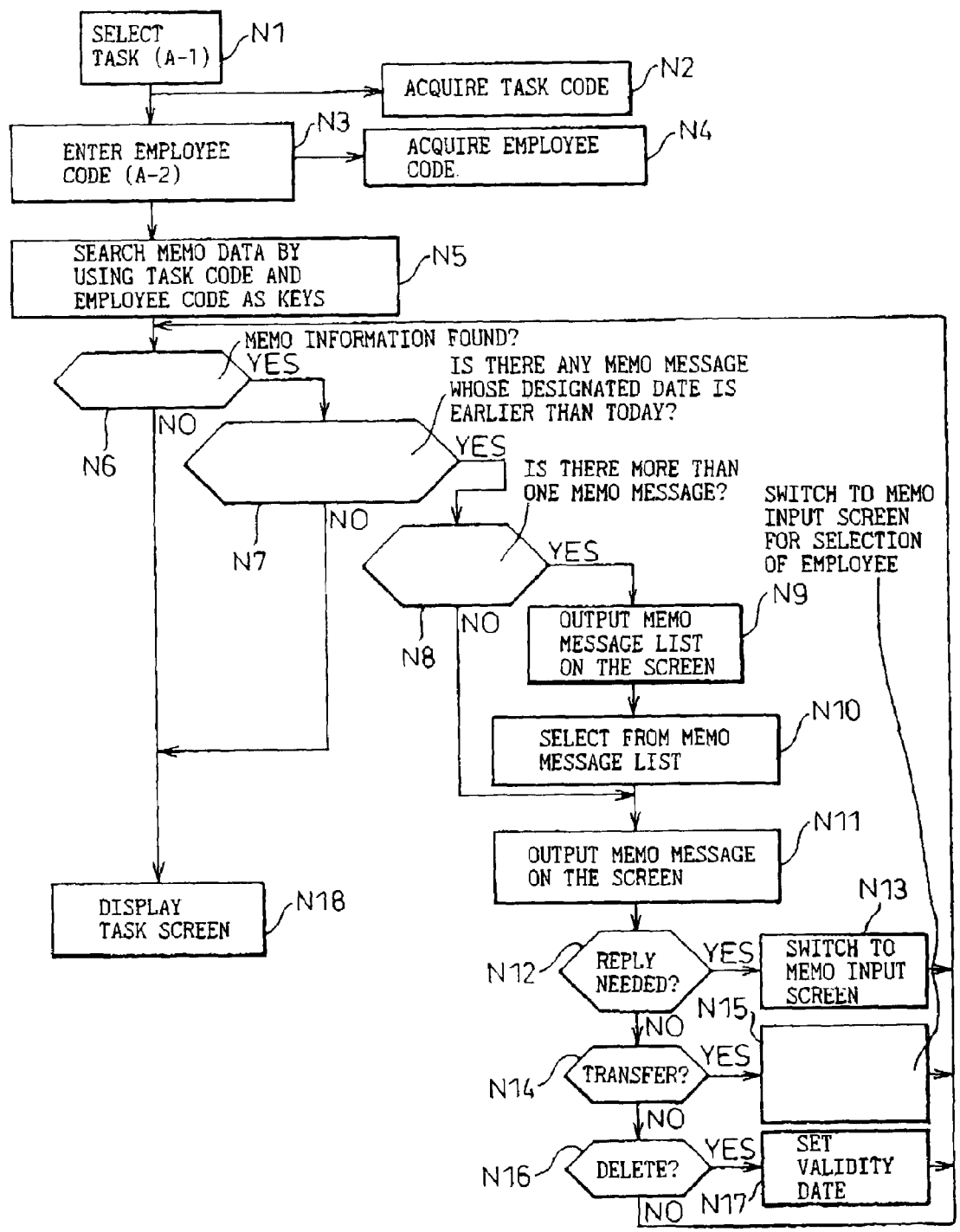
FIG. 17 shows a flowchart illustrating yet another example of the memo information output process.

FIG. 17 is a diagram showing the processing flow when the keys set at the time of the memo input are an employee code and a task code. First, when the desired task selection button is operated on the initial screen (A-1) (step N1), the communication management task program automatically acquires the task code (step N2). Next, the display screen changes to the screen (A-2) (step N3), and when the employee code is entered, the communication management task program automatically acquires the employee code (step N4).

When the task code and the product code are both acquired in this manner, the communication management task program automatically starts to search the memo data on the hard disk 212 by using these codes as the keys (step N5).

Steps N6 to N18 to be performed after the memo data searching are the same as the corresponding steps P5 to P16 in the processing flow of FIG. 12 performed using the employee code as the key, and therefore will not be described here.

When all the processing for the output of the memo is completed, the process proceeds to step N19, and the display screen is switched to the screen (for example, the screen (B-1)) for executing the task selected in step N1.

Figure 18:
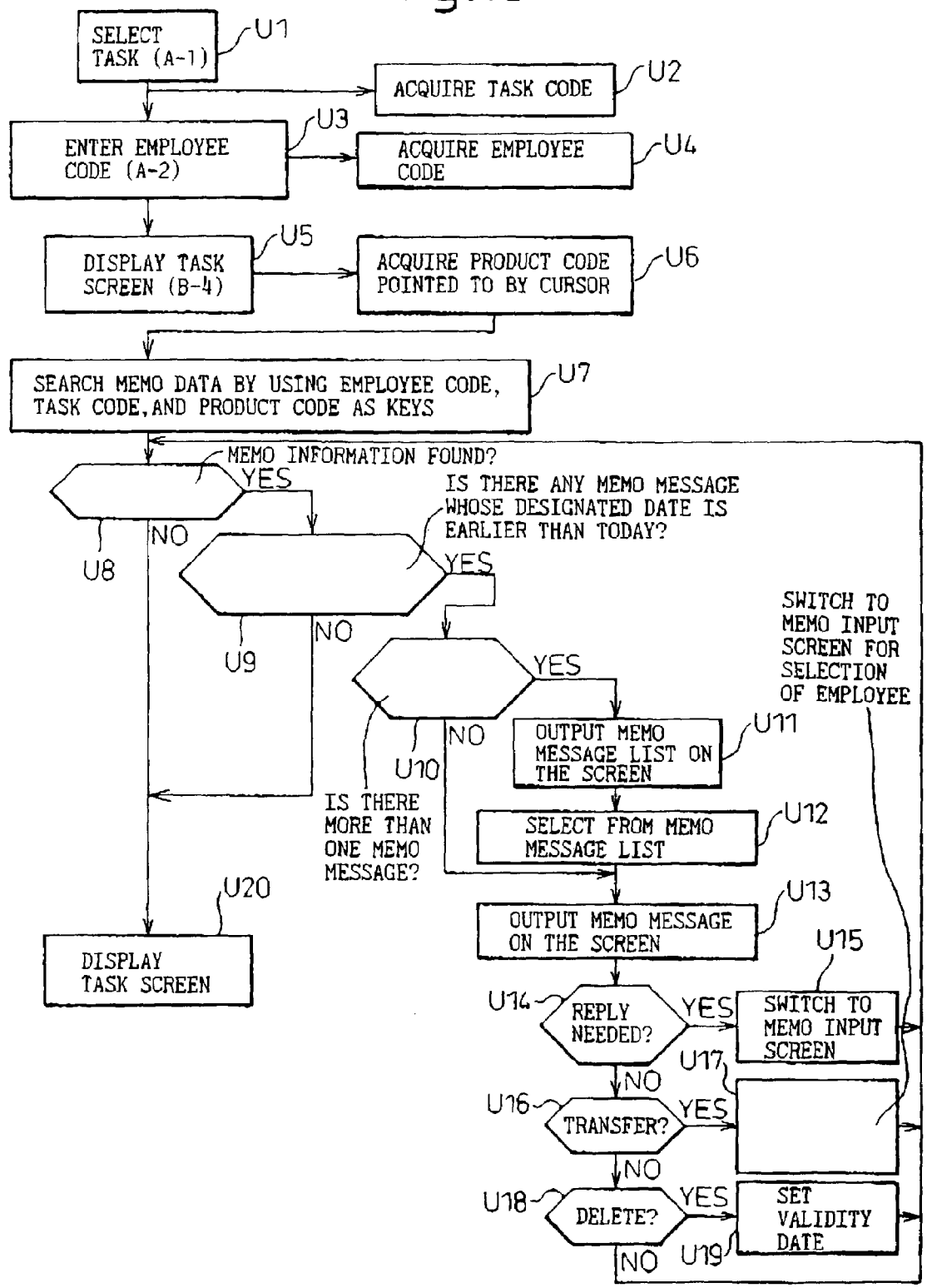
FIG. 18 shows a flowchart illustrating a further example of the memo information output process.

FIG. 18 is a diagram showing the processing flow when the keys set at the time of the memo input are an employee code, a task code, and a product code. First, when the desired task selection button is operated on the initial screen (A-1) (step U1), the communication management task program automatically acquires the task code (step U2). Next, the display screen changes to the screen (A-2) (step U3), and when the employee code is entered, the communication management task program automatically acquires the employee code (step U4).

In step U5, the task screen is displayed on the display 27. On this task screen, when the employee positions the cursor at a product as part of the task performing operation, the communication management task program automatically acquires its product code (step U6).

When the employee code, the task code, and the product code are acquired in this manner, the communication management task program automatically starts to search the communication information data base by using these codes as the keys (step U7). Steps U8 to U19 to be performed after the memo data searching are the same as the corresponding steps P5 to P16 in the processing flow of FIG. 12 performed using the employee code as the key, and therefore will not be described here.

Figure 31:
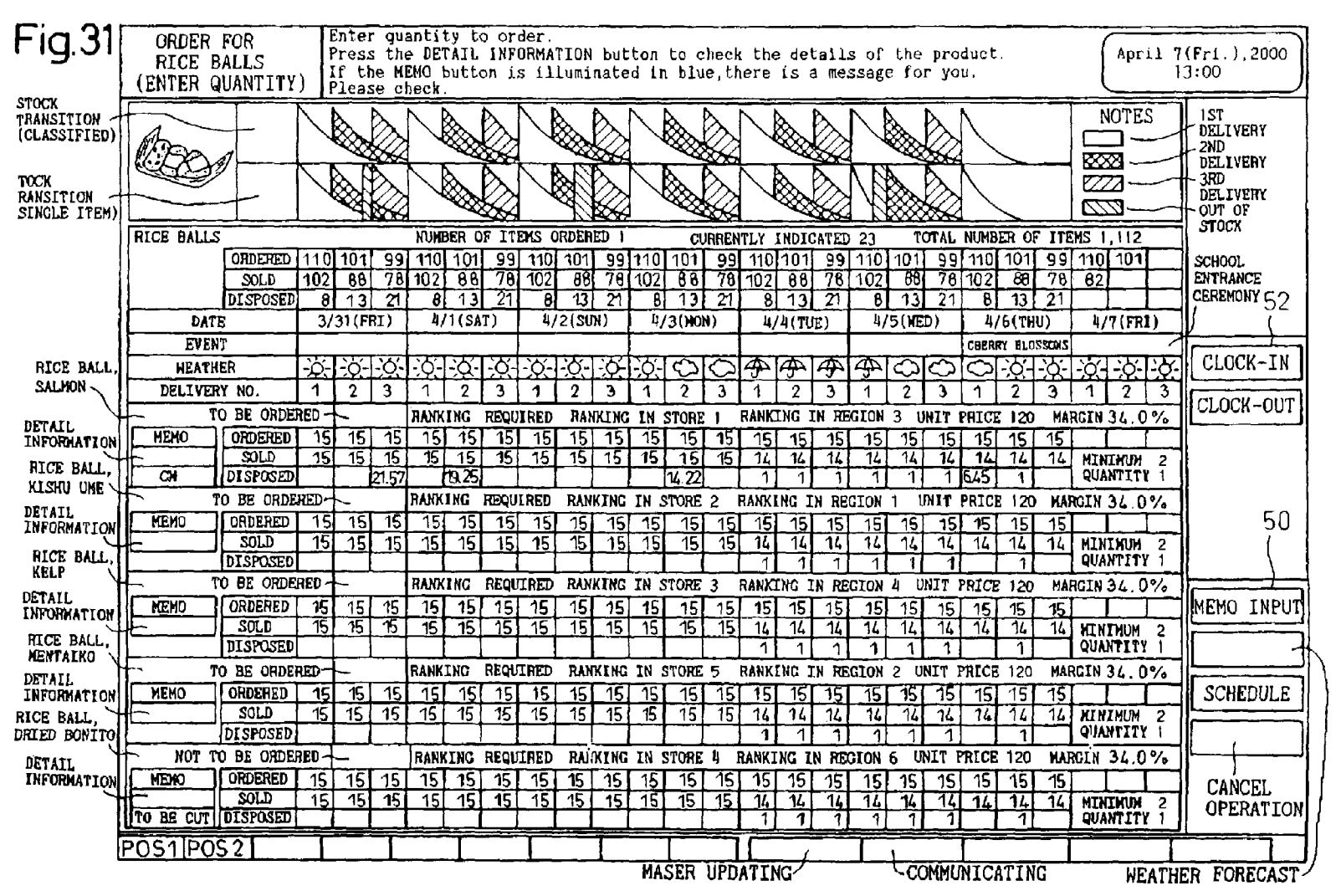

When all the processing for the output of the memo is completed, the process returns to step U8 to determine whether there is any other memo information remaining; when there is no other memo information remaining, the task screen (for example, the screen (B-4) of FIG. 31) is displayed on the display 27 in step U20.

Figure 19:
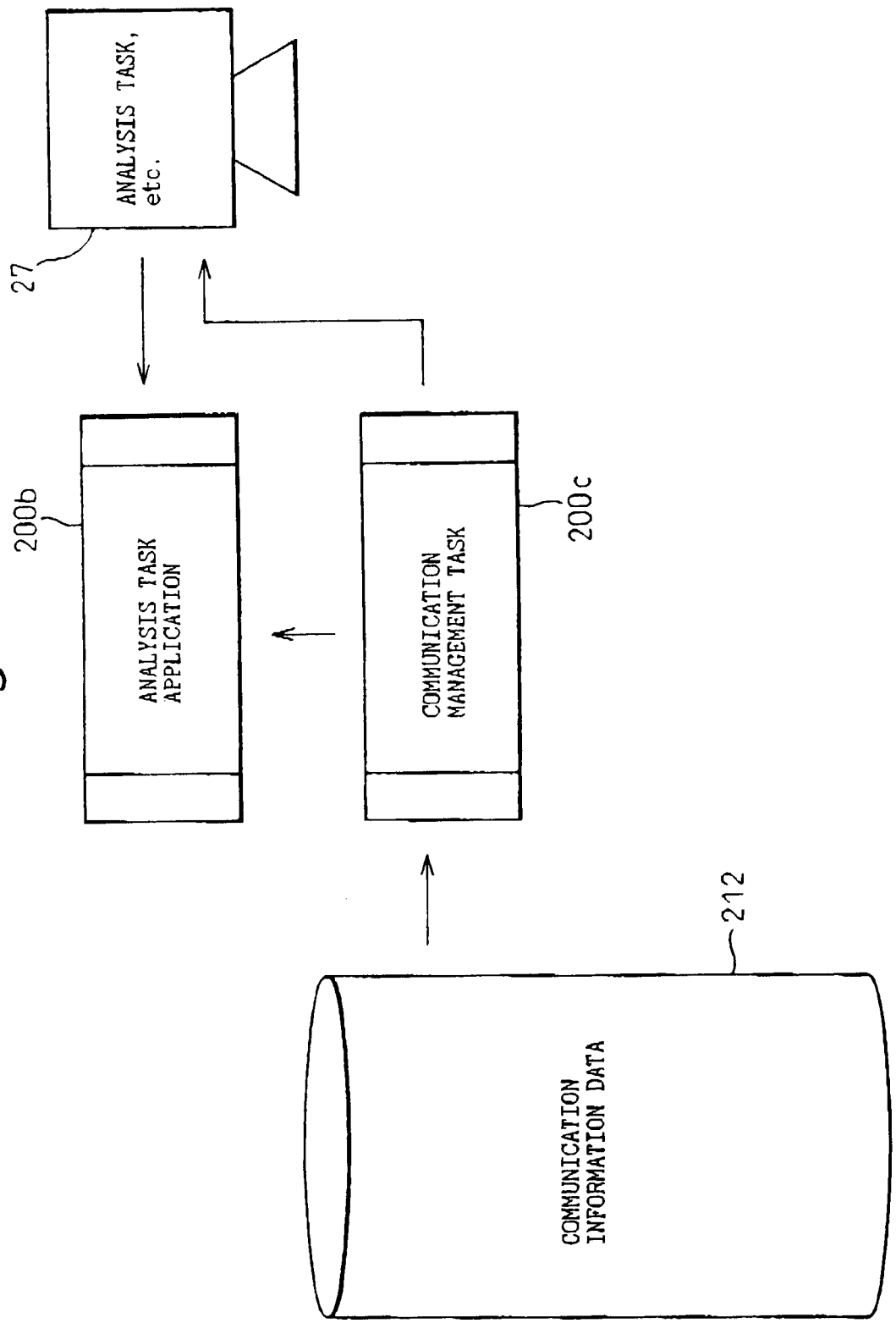
FIG. 19 is a diagram showing the flow of data in a still further example of the memo information output process.

FIG. 19 is a block diagram showing the flow of data when utilizing the memo information data base to analyze the result of the task performed in the store. When the employee who is going to analyze the task enters his or her employee code (ID) and selects the ANALYSIS task on the display screen, the analysis task application is activated within the store controller. When the employee hooks the analysis task application input information (classification code, product code, etc. set as the key information) displayed on the screen, the communication management task program 200c is activated and the communication information data base on the hard disk 212 is searched by using the key information as the search key. When the matching key information is found as a result of the search, the handwritten or voice memo information is displayed in a pop-up fashion on the input screen.

In this way, the employee who is going to perform the analysis task can automatically obtain the memo information necessary for the task to be analyzed, without having to rely on his or her memory.

Figure 20:
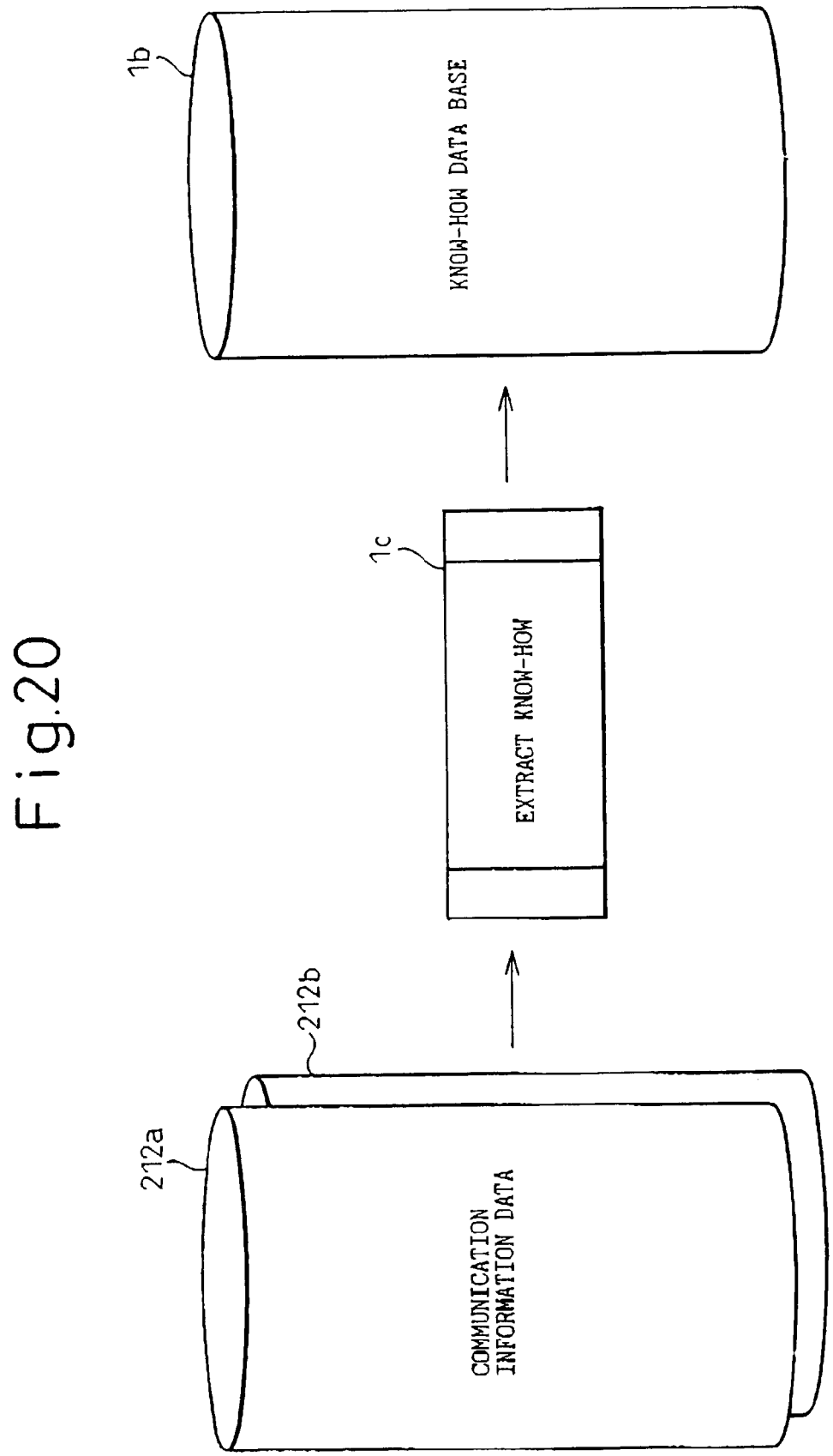
FIG. 20 is a diagram showing the flow of data when constructing a know-how data base by utilizing accumulated memo information.

FIG. 20 is a block diagram showing the flow of data when the host computer at the convenience store headquarters constructs a know-how data base from the communication information data base maintained at each store.

As shown, the data stored as text data on the hard disks 212*a*, 212*b*, etc. at the respective stores are transmitted via the communication line to the host computer at the headquarters, where the data are processed by a know-how extraction program 1*c* to extract various kinds of know-how. The data base is constructed by accumulating the extracted know-how data in a storage device 1*b*.

Means for moving the various kinds of information accumulated as handwritten memos at each store to the headquarters has not been available in the prior art; in contrast, according to the present invention, since the memo information is converted into text information and stored with key information appended thereto as a data base in a storage device, the information can be easily transmitted to the host computer at the headquarters. In this way, the memo information which has previously been no more than a means of communication between employees can be utilized as an important information source for sales management.

What is claimed is:

1. A store system comprising:
   a store controller including software for communication from a first operator to a second operator, for communication from said second operator to said first operator, and for executing sales and sales management tasks;
   a display for displaying a screen for the execution of a task specified by said software;
   first input means for inputting data to said store controller in accordance with an instruction displayed on the screen produced on said display; and
   second input means for inputting memo information to said store controller, wherein said memo information is handwritten memo information, wherein said handwritten memo information is inputted directly to said store controller without key stroke,
   wherein said store controller further includes:
   first software for requesting said first operator to select key information to be appended to said memo information as a search key when said first operator inputs said memo information via said second input means, and for storing said memo information, together with said appended key information and an employee code of said first operator, in a storage device within said system; and
   second software for automatically searching said storage device with said key information as a search key when said second operator inputs data which corresponds to said key information, via said first input means, according to said instruction displayed on said screen during the execution of said task, and for displaying searched memo information on said display,
   wherein said key information includes at least one code selected from among an employee code of a destination employee of said memo information, a task code, and a product code,
   wherein said first and second operators operate in staggered shifts in a store.

* * * * *